(12) United States Patent
Gupta

(10) Patent No.: US 7,833,575 B2
(45) Date of Patent: Nov. 16, 2010

(54) METHODS FOR APPLYING FIRE RETARDANT SYSTEMS, COMPOSITIONS AND USES

(76) Inventor: Laxmi C. Gupta, 2852 Mainway Dr., Los Alamitos, CA (US) 90720

( * ) Notice: Subject to any disclaimer, the term of this patent is extended or adjusted under 35 U.S.C. 154(b) by 793 days.

(21) Appl. No.: 11/593,747

(22) Filed: Nov. 7, 2006

(65) Prior Publication Data
US 2007/0166454 A1 Jul. 19, 2007

Related U.S. Application Data

(60) Provisional application No. 60/734,960, filed on Nov. 8, 2005, provisional application No. 60/843,721, filed on Sep. 11, 2006.

(51) Int. Cl.
*B05D 1/12* (2006.01)
*B05D 1/36* (2006.01)

(52) U.S. Cl. .................. 427/202; 427/180; 427/201

(58) Field of Classification Search ............... 427/180, 427/201, 202
See application file for complete search history.

(56) References Cited

U.S. PATENT DOCUMENTS

| | | | |
|---|---|---|---|
| 4,772,642 A | 9/1988 | Staendeke | |
| 5,165,904 A | 11/1992 | Staffel et al. | |
| 5,213,783 A | 5/1993 | Fukumura et al. | |
| 5,277,887 A | 1/1994 | Staffel et al. | |
| 5,534,291 A | 7/1996 | Fukumura et al. | |
| 5,599,626 A | 2/1997 | Fukumura et al. | |
| 6,291,068 B1 | 9/2001 | Wang et al. | |
| 6,753,061 B1 | 6/2004 | Wedi | |
| 2002/0156967 A1 | 10/2002 | Okuda | |
| 2005/0143503 A1* | 6/2005 | Bauer et al. | ............. 524/115 |
| 2006/0138391 A1 | 6/2006 | Drewes et al. | |
| 2006/0160978 A1* | 7/2006 | Gupta et al. | ............. 528/44 |

FOREIGN PATENT DOCUMENTS

JP 6025469 2/1994

OTHER PUBLICATIONS

International Search Report mailed Sep. 18, 2007 (4 pgs).

* cited by examiner

*Primary Examiner*—Frederick J Parker

(57) ABSTRACT

A method is provided for applying a fire retardant coating system. The method comprises providing a first component that is a coatable polymeric coating composition and a second component comprising granules, wherein the granules comprise a polymeric matrix comprising a plurality of regions of fire retardant material ingredient incorporated therein. The first component and the second component are separate as delivered to the site of application. The first component and the second component are applied onto a substrate so that the granules are adhered to the substrate by the polymeric coating composition. The polymeric coating composition is then allowed to cure to form a fire-retardant coating. The resulting fire-retardant coating affords surprising fire retardancy performance.

20 Claims, 11 Drawing Sheets
(8 of 11 Drawing Sheet(s) Filed in Color)

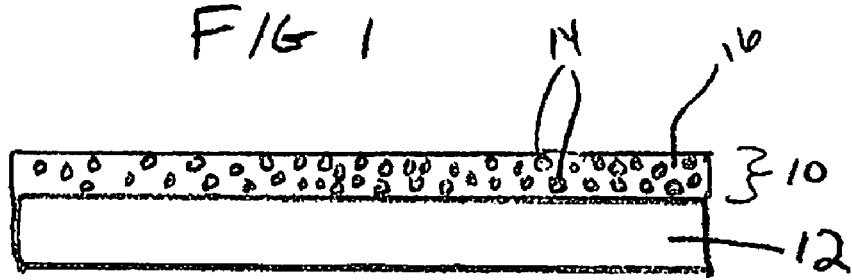
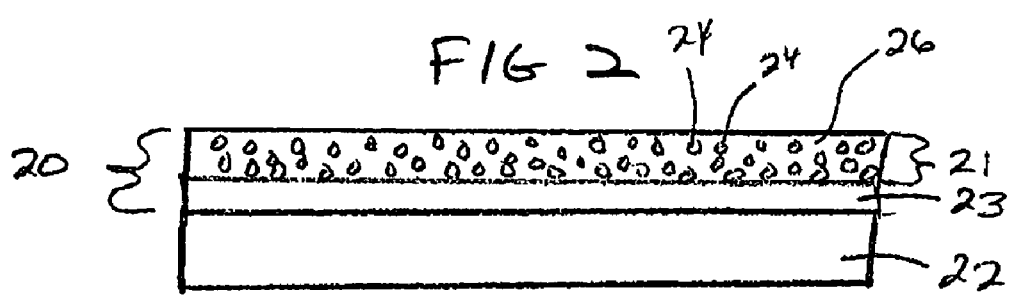
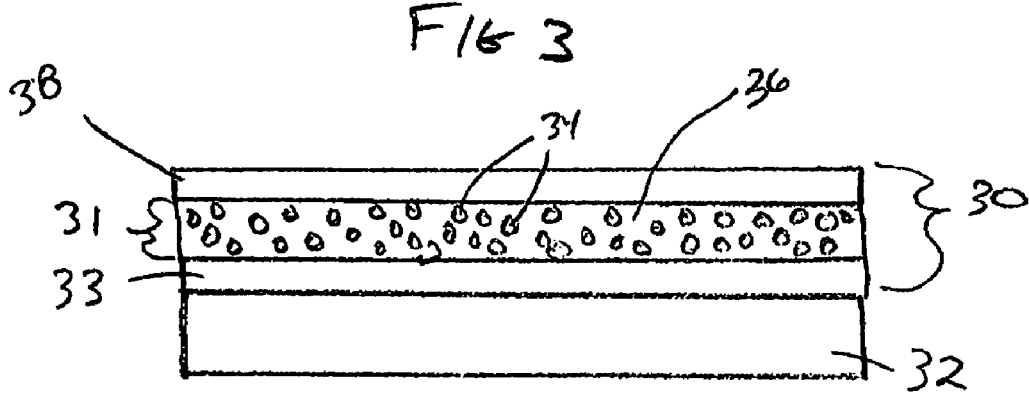

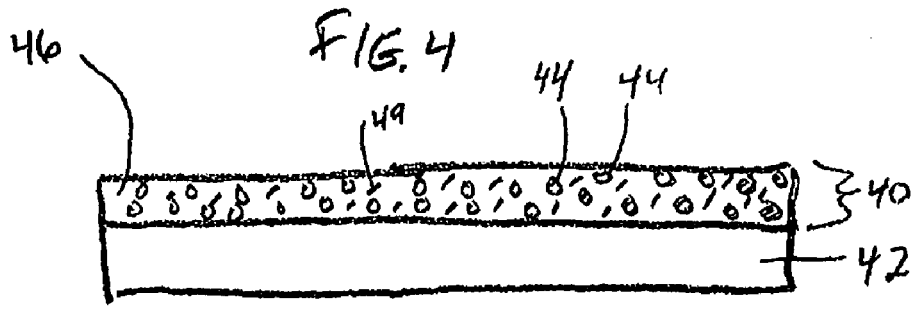
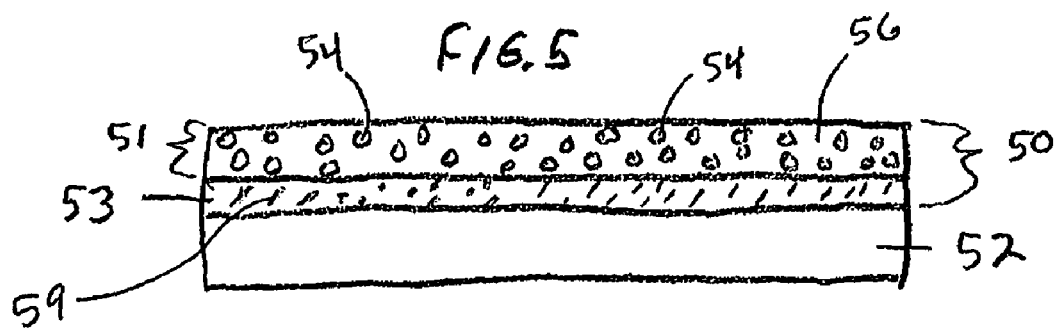
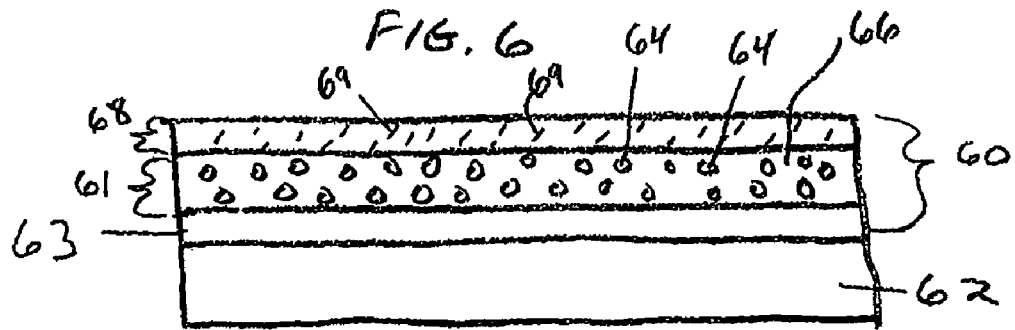

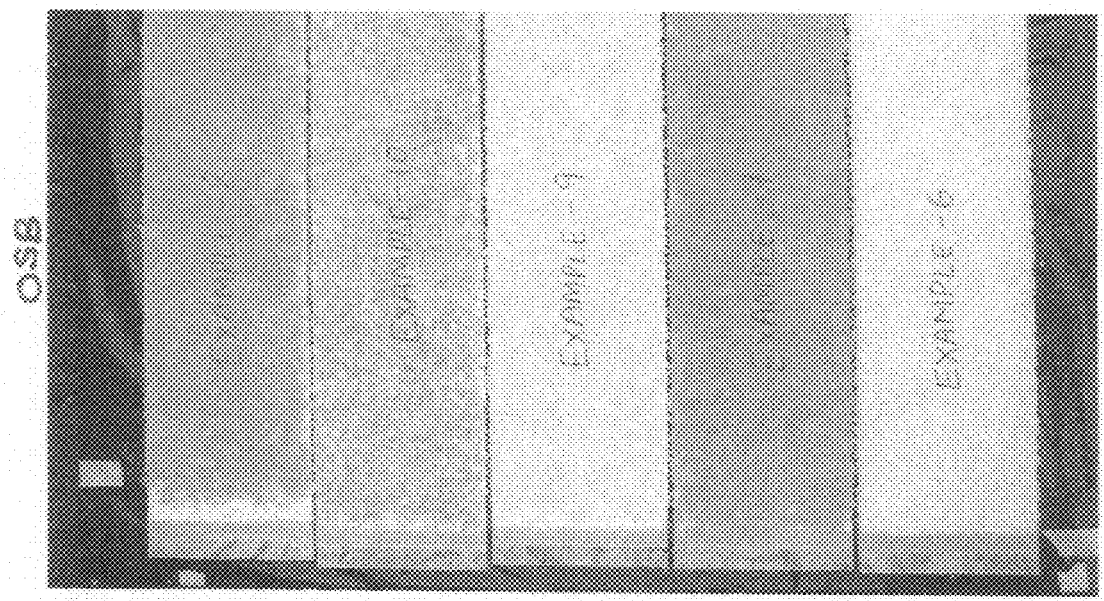
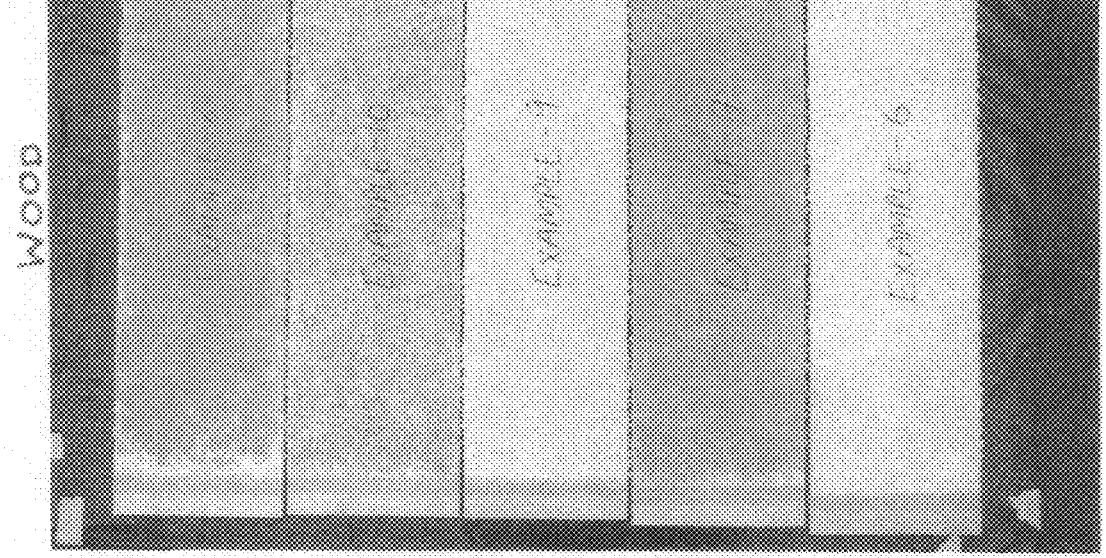
Fig. 9

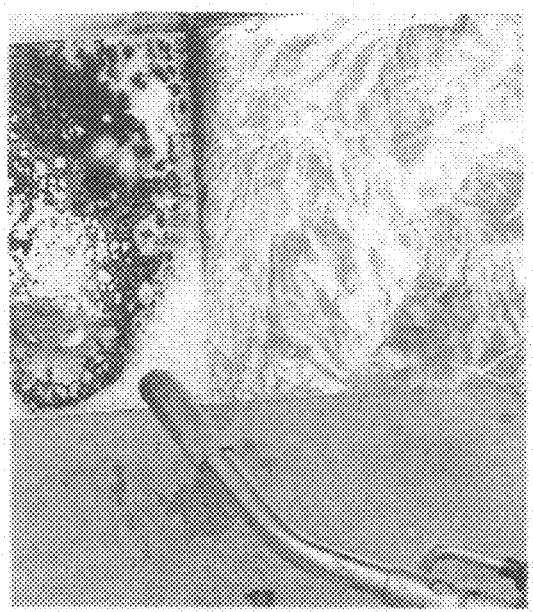
Fig. 10

METHODS FOR APPLYING FIRE RETARDANT SYSTEMS, COMPOSITIONS AND USES

PRIORITY CLAIM

This application claims priority to U.S. Provisional application No. 60/734,960, entitled METHODS FOR APPLYING FIRE RETARDANT SYSTEMS, COMPOSITIONS AND USES, filed on Nov. 8, 2005, which is herein incorporated by reference in its entirety. This application also claims priority to U.S. Provisional application No. 60/843,721, entitled METHODS FOR APPLYING FIRE RETARDANT SYSTEMS, COMPOSITIONS AND USES, filed on Sep. 11, 2006, which is herein incorporated by reference in its entirety.

FIELD OF INVENTION

The present invention relates to fire retardant systems and related methods and uses of such fire retardant systems.

BACKGROUND OF THE INVENTION

Fire retardants are well-known and are typically added to and/or applied as a surface treatment to help prevent the spread of fire and/or protect a material exposed to fire. Commercially available fire retardants may be obtained in great variety, including examples such as bromine-based fire retardants, phosphorous-based fire retardants (e.g., ammonium polyphosphate (APP)), nitrogen-based fire retardants (e.g., melamine), inorganic-based fire retardants, and chlorine-based fire retardants.

A fire retardant can also be classified by the mechanism in which it acts as a fire retardant. A well-known flame retarding mechanism is known as "intumescence," and is attributable to the fire retardant category known as "intumescents." Intumescent fire retardants expand and form a char layer as a barrier between the underlying material and surrounding environment. This char layer is hard to burn, and insulates and protects the underlining material from burning. Intumescents operate by expansion either as a result of a chemical reaction under heat, or as by a primarily physical reaction that occurs due to the configuration of components in the intumescent material. Examples of chemical intumescents include phosphate-based materials and silica gel/potassium carbonate mixtures. Examples of physical intumescents include expandable graphite.

Fire retardants can be used with a wide variety of items such as furniture, floors (e.g., floor coverings), decks (e.g., deck coverings), textiles, cables, building materials and insulation, electrical equipment, structures like pipe racks, equipment foundation, supporting structures, columns, beams, transportation equipment (e.g., truck-bed liners), roofs (e.g., roof coating), and the like. It would be desirable to use fire retardants in two-part, isocyanate-base, curable systems to provide cured compositions with flame retardancy, but often such use is not a reality because of technical hurdles involved in incorporating fire retardants in two-part, curable systems.

There is a continuing need for new and improved fire retardant systems that can be readily applied to surfaces and in particular, to existing building structures.

SUMMARY OF THE INVENTION

A unique system for application of fire retardant materials is provided wherein substrates such as building structures, docks, roof, equipment, machinery and other critical structures for residential, commercial, industrial, defense and the space industry can be provided with a level of fire protection in an economical manner that was not previously achievable. In the present system and method, the problems previously experienced in incorporating a fire retardant material in a coating composition are overcome. More specifically, a method is provided for applying a flame or fire retardant coating system to a substrate. The method comprises the steps of:

a) providing a first component that is a coatable polymeric coating composition;

b) providing a second component comprising granules, wherein the granules comprise a polymeric matrix comprising a plurality of regions of fire retardant material ingredient incorporated therein, the first component and the second component provided as separate compositions as delivered to the site of application;

c) applying the first component and the second component onto a substrate so that the granules are adhered to the substrate by the polymeric coating composition; and d) allowing the polymeric coating composition to cure to form a fire-retardant coating.

Additionally described is a polymeric fire retardant coating kit, comprising a first component that is a coatable polymeric coating composition; and, as a discreet composition, a second component comprising granules, wherein the granules comprise a polymeric matrix comprising a plurality of regions of fire retardant material ingredient incorporated therein; wherein the system is at least a two part kit having the first component and the second component provided as separate compositions as delivered to the site of application.

The presently described method and system provides a very efficiently applied fire retardant coating system that exhibits exceptional fire retarding properties. Because the granules comprising a fire retardant ingredient are not provided in the coating composition until application, there are no problems with adverse reaction of the fire retardant ingredient with the coating composition. Additionally, it has been found that direct incorporation of fire retardant ingredients in one part coating compositions, particularly at the presently desired fire retardant ingredient concentration levels, can lead to viscosity issues in mixing and/or application, making application of such compositions on site difficult if not completely impractical.

Additionally, the fire retardant coating of the present invention surprisingly can be formulated to be applied to a surface of virtually any configuration, including curved surfaces, angled surfaces, and surfaces of any orientation, including horizontal, sloped, vertical and inverted or upside-down configuration. In a particularly advantageous embodiment of the present invention, the fire retardant coating of the present invention does not flow during exposure to extreme heat and/or flame, thereby providing substantial safety benefits.

While not being bound by theory, it is believed that the physical configuration of the fire retardant coating as obtained by application to the substrate on site as described herein contributes to the fire retardancy performance of the system, so that the resulting fire-retardant coating affords surprising performance that would not be obtained by a pre-mixed composition of a fire retardant ingredient in a coating composition. It is believed that the unique configuration afforded by having fire retardant ingredients concentrated in regions in the granules contributes to the effectiveness of the coating in fire retardant properties. Thus, the in-situ mixing configuration and performance of the ultimate fire-retardant coating is distinct from an article where the fire retardant ingredient is fully incorporated as a homogeneous or semihomogeneous ingredient in a curable coating composition that is extruded, cast or bulk cured to form a final article.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated in and constitute a part of this application, illustrate several aspects of the invention and together with a description of the embodiments serve to explain the principles of the invention. A brief description of the drawings is as follows:

FIG. 1 is an edge view of a fire retardant coating system of the present invention in place on a substrate.

FIG. 2 is an edge view of an alternative fire retardant coating system of the present invention in place on a substrate.

FIG. 3 is an edge view of an alternative fire retardant coating system of the present invention in place on a substrate.

FIG. 4 is an edge view of an alternative fire retardant coating system of the present invention in place on a substrate.

FIG. 5 is an edge view of an alternative fire retardant coating system of the present invention in place on a substrate.

FIG. 6 is an edge view of an alternative fire retardant coating system of the present invention in place on a substrate.

FIG. 9 is a color photograph of samples 6-10 having the fire retardant coating system applied thereto, prior to application of a topcoat.

FIG. 10 is a color photograph of a flame test of the fire retardant coating system of Example 6.

DETAILED DESCRIPTION OF PRESENTLY PREFERRED EMBODIMENTS

Figure 7:
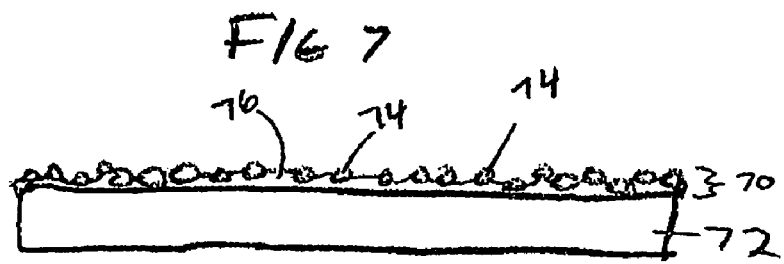
FIG. 7 is an edge view of an alternative fire retardant coating system of the present invention in place on a substrate.

The embodiments of the present invention described below are not intended to be exhaustive or to limit the invention to the precise forms disclosed in the following detailed description. Rather a purpose of the embodiments chosen and described is so that the appreciation and understanding by others skilled in the art of the principles and practices of the present invention can be facilitated.

Turning now to the drawing for further illustration, wherein like numerals indicate like parts, FIG. 1 is an edge view of a fire retardant coating system 10 of the present invention in place on a substrate 12. System 10 as shown is a fire retardant coating that comprises granules 14 distributed within polymeric coating matrix 16. Preferably, granules 14 are homogeneously distributed within polymeric coating matrix 16 to provide uniform protection of substrate 12 from fire.

Fire retardant coating system 10 is provided by a method comprising application of at least a two part system to the substrate. More specifically, the method comprises first providing both a first component that is a coatable polymeric coating composition and a second component comprising granules as described herein. The first component and the second component are separate as delivered to the site of application. This provision of these components as a two part system provides specific advantages in ease of application and in the performance of the product on the substrate. It has been found that the fire retardant ingredient, even when provided in granular form, adversely affects the viscosity and potentially even the polymeric coating chemistry itself when the first component and the second component are provided in a single composition, rather than as separate compositions.

The first component and the second component are applied onto a substrate so that the granules are adhered to the substrate by the polymeric coating composition. The polymeric coating composition is allowed to cure to form a fire-retardant coating.

The first component of the system is a coatable polymeric coating composition, which can be any appropriate curable polymeric system for coating a substrate. A one part coatable polymeric coating composition, such as polyurethane, acrylic, silicone or alkyd polymeric coating composition may be used. Preferred such systems include moisture cured polymeric systems, and in particular moisture cured urethane polymer systems.

Preferably, the coatable polymeric coating composition is a two part coating compositions that cures by mixing the parts together, such as a polyurea, polyurethane and/or epoxy coating. A particularly preferred coatable polymeric coating composition is a two-part, isocyanate-based, curable system.

Two-part, isocyanate-based, curable systems are well-known. Such systems generally include a compound having isocyanate functionality (NCO functionality) in a first part (or A-side) and a material reactive with the NCO functionality in a second part (or B-side). The first part and second part are typically stored in separate packages/containers until it is time to form the cured composition. At the time of use (i.e., time to form a cured composition) the first and second parts of such systems can be mixed together, applied to a surface or used in a desired manner, and allowed to cure (often at relatively low temperatures such as room temperature) to form a cured composition, such as a coating having useful properties such as a wide range of flexibility yet suitable toughness, high abrasion resistance, high chemical resistance, high acid etch resistance, high weatherability, and the like. Such coatings have found commercial success in vehicle products (e.g., truck bed liner), roof products (e.g., roof coating), decking products (deck coating) and floor products (e.g., floor coating).

Materials that are reactive with isocyanate functionality to form such cured compositions include hydroxyl functional compounds to form polyurethanes, amine functional compounds to form polyureas, combinations of these, and the like. Exemplary two-part, isocyanate-based, curable systems useful with a fire retardant system according to the present invention are commercially available from, e.g., Polycoat Products, Santa Fe Springs, Calif., under the trade designations POLYEURO® MPL 11 FR and POLYEURO® 7502FR.

The second component comprises granules, wherein the granules comprise a polymeric matrix comprising a plurality of regions of fire retardant material ingredient incorporated therein. Any appropriate granule formation process may be used, such as by encapsulation technologies such as spray coating technologies and the like, to provide the desired configuration of a polymeric matrix comprising a plurality of regions of fire retardant material ingredient incorporated therein.

In a preferred embodiment of the present invention, the granules are formed by dispersing the fire retardant ingredient in a polymerizable composition and forming a matrix comprising a plurality of regions of fire retardant material ingredient having a shape. The dispersing and shape formation can be carried out by any suitable method now apparent to the artisan, such as by extrusion, coating, injection molding, or any other appropriate manner. The matrix is then cured in a solid shape, which preferably is a sheet material. The solid shape is then cut or ground into the desired granule size pieces.

The granules may comprise any appropriate polymer for the matrix material. Preferably, the matrix is a rubbery material having a Shore A hardness of from about 25 to about 95, more preferably from about 45 to about 85. Advantageously, the use of rubbery or hard materials in the formulation of granules can enhance durability of the ultimate coating composition, add to elastomeric properties and optionally provide a textured surface for aesthetic or practical purposes. For example, a coating on a substrate that has visually perceptible granules completely or partially entrained therein can provide an excellent non-slip tread surface for walking. Preferred polymers for use in the matrix include thermoplastic polyolefin (TPO), rubbers such as butyl rubber, ethylene polypropylene rubber (EPR), ethylene propylene diene monomer polymers (EPDM), poly vinyl chloride, epoxy, polyurethane (such as Millathane® 66 PU polyurethane from TSE Industries, Inc, Clearwater, Fla.) polyurea, polyester, silicone rubber or gum, and copolymers and blends thereof. Optionally, the matrix may be crosslinked before or after formation of the granule. In a preferred process, the matrix is cured and crosslinked in a solid shape, such as the sheet material described above. The solid shape is then cut or ground into the desired granule size pieces. Any suitable crosslinker may be used as appropriate for the polymer of the matrix. In an embodiment of the present invention, the polymer comprises unsaturated functionality, and a suitable crosslinker such as a sulfur crosslinker is used to provide the desired crosslinking. This embodiment may be less preferred because polymer having residual unsaturated functionality in the chain may be less stable under certain environments of use. Additionally, the use of sulfur as a component of the matrix may provide objectionable amounts of smoke and unpleasant odor when exposed to flame or high heat. In a preferred embodiment, the polymer may be crosslinked using a peroxide or other free radical initiated crosslinking system.

The granule may optionally comprise fillers, colorants and other such additives suitable for incorporation into granules as will now be appreciated by the skilled artisan.

Preferably, the granules comprise from about 0.1 to about 90 wt percent fire retardant ingredient, more preferably from about 10 to about 80, most preferably from about 30 to about 60 wt. percent. In an embodiment of the present invention, it has particularly been found that granules provide excellent fire retardancy properties when they comprise from about 45% to about 75% fire retardant ingredient by weight of the total weight of the granule. For purposes of the present invention the weight of the fire retardant ingredient includes any encapsulation material if the fire retardant ingredient is pre-encapsulated.

Preferred average granule size is from about 90 mesh to about 0.25 inch in the longest dimension, more preferably from about 60 mesh to about 6 mesh, and most preferably from about 60 mesh to about 12 mesh.

The fire retardant ingredient is any appropriate ingredient such as is known in the art to suppress flame. Preferably, the fire retardant ingredient is an intumescent. In one embodiment of the present invention, the fire retardant component is a material that expands as a result of a chemical reaction under heat. In another embodiment of the present invention, the fire retardant component is a material that expands as a result of a primarily physical reaction that occurs due to the configuration of components in the intumescent material.

The chemically based intumescents generally comprise ingredients that serve three different functions: a charring agent to provide carbon for forming the char; a so called catalyst, drying agent or acid source to promote formation of the char from the carbon source; and a blowing agent or gas source to expand the char. These functions may be carried out by three separate ingredients, or by a single ingredient that can perform more than one function. In one embodiment, the preferred fire retardant component comprises ingredients selected from the group consisting of phosphate-based materials and silica gel/potassium carbonate mixtures.

Typical fire retardant ingredients can be classified as either halogenated or non-halogenated. Halogenated fire retardants contain a mixture of primary, secondary or tertiary halogen, which can dehydrohalogenate over a wide range of temperatures. The evolution of the hydrogen halide is beneficial to flame retardancy. Examples of halogen containing fire retardants include chlorinated paraffins, and brominated biphenyls such as tetrabromobisphenol A and decabromodiphenyl oxide.

Non-halogenated fire retardant ingredients are mainly metallic oxides or hydroxides that contain water of hydration. Examples of these include aluminum trihydride (ATH) and magnesium hydroxide, both of which provide fire retardancy from their inherent water content. Antimony trioxide and zinc borate are also used as fire retardant additives in view of their fire retardancy. Antimony trioxide is often used in combination with halogenated fire retardant additives such as tetrabromobisphenol A.

Another family of fire retardants is the halogen and phosphorus containing compounds, such as tris(2,3-dibromopropyl)phosphate and other phosphate esters. Antimony trioxide is often used in combination with phosphate esters. Additional fire retardant ingredients include nitrogen-based fire retardants, such as melamine. A preferred melamine coated, APP fire retardant ingredient for use in the present invention is commercially available from JLS Fire retardants Chemical Inc., Pomona, Calif., under the tradename JLS-APP101. This melamine coating has intumescent properties which enhances the flame retardancy properties of the fire retardant system of the invention.

In a particularly preferred embodiment of the invention, the fire retardant ingredient is halogen-free. Preferably, the flame-retardant ingredient is phosphate-based. Preferred phosphate-based fire retardant ingredients include polyphosphates, preferably ammonium polyphosphate (APP). APP and methods of making APP are well known as described in, e.g., U.S. Pat. No. 5,165,904 (Staffel et al.), U.S. Pat. No. 5,277,887 (Staffel et al.), and U.S. Pat. No. 5,213,783 (Fukumura et al.). An embodiment of a fire retardant system contemplated herein includes a phosphorus constituent and a polymeric ethylene-urea condensation product as a nitrogen-containing synergist for the intumescent fire-retardant system, as described in U.S. Pat. No. 4,772,642 to Staendeke. An example of a non-halogen fire barrier additive that can be used as the fire retardant component of the present invention or in combination with fire retardants is the Ceepree line of ceramifying fire barrier additives from Ceepree Products Ltd, Cheshire, UK.

Mixtures of fire retardant ingredients can also be used.

The fire retardant ingredient optionally can be pre-encapsulated before formation of the granule, and preferably is encapsulated with an encapsulation material that additionally functions in support of fire retardancy. Examples of functional encapsulation material include charring agents such as starch, dextrin, sorbitol pentaerythritol, phenol-formaldehyde resins or methylol melamine encapsulation materials, or the like.

Particularly preferred fire retardant ingredients include coated APP, which is well known as described in, e.g., U.S. Pat. No. 6,291,068 (Wang et al.), U.S. Pat. No. 5,599,626 (Fukumura et al.), and U.S. Pat. No. 5,534,291 (Fukumura et al.), the disclosures of which are incorporated herein by reference. A preferred silicone coated, APP fire retardant ingredient for use in the present invention is commercially available from JLS Fire retardants Chemical Inc., Pomona, Calif., under the tradename JLS-APP102.

In a preferred embodiment, the second component consists only of granules in the dry form. Alternatively, the granules may be providing in a reactive or non-reactive carrier liquid in the form of a slurry for application or mixing with the second component.

The granules are preferably present as from about 0.5 to about 70 weight percent based on the total weight of the fire-retardant coating, more preferably as from about 5 to about 60 weight percent based on the total weight of the fire-retardant coating, even more preferably as from about 10 to about 50 weight percent based on the total weight of the fire-retardant coating.

The substrate, in one embodiment, can be coated by simultaneous spraying of both the first and second components onto the substrate. In a preferred embodiment, a two component spray machine is used to mix and apply the first component and the second component in a single spray.

In another embodiment, the first component is a two part sprayable polymeric coating composition, and a three component spray machine is used to mix and apply the second component and the two parts of the first component in a single spray. An example of such a spray machine is the Probler Gun from GlasCraft, Inc., Indianapolis, Ind. 46278.

Optionally, the spray machine is equipped with one or more additional feed systems to allow simultaneous addition of other components, such as filler, to the composition being applied to the substrate by the spray machine.

In an alternative embodiment, the first component is applied onto the substrate first, followed by applying the second component onto the substrate that has been coated with the first component. In one embodiment, the first component is applied onto the substrate by any application process, such as spraying, rolling, squeegeeing, or brushing, followed by applying the second component onto the substrate that has been coated with the first component by spraying or broadcasting. Likewise, the second component can be applied onto the substrate first, followed by application of an overcoat of the first component onto the substrate.

In another alternative embodiment, the first component and the second component are mixed together prior to application to the substrate. The mixture is then applied to the substrate in any appropriate manner, such as by troweling. Because these mixtures have limited working time or pot life, typically the application step takes place within about 4 hours, more preferably within about 30 minutes, and most preferably within about 15 minutes, of initiation of the mixing of the first and second components.

In all application techniques, it is specifically contemplated that an additional application, such as by broadcasting, of granules may be made to the coated substrate prior to complete cure of the first component, thereby increasing the amount of granules bound to the substrate.

Various mechanisms as will now be apparent to the artisan may be used for applying the first and the second component to a substrate, including pressure pots, hopper assemblies, and/or actuator control blowers. While gravity feed mechanisms are contemplated, such systems have been found to be difficult to effectively use. Preferably, the applicator system comprises forced air, screw feed, or other mechanized feeding devices to assure proper mixing and delivery of components to the substrate. All combinations of these different application methodologies are contemplated.

FIG. 2 is an edge view of a fire retardant coating system 20 of the present invention in place on a substrate 22. System 20 comprises primer layer 23 on substrate 22, with fire retardant coating 21 on primer layer 23. Fire retardant coating 21 comprises granules 24 distributed within polymeric coating matrix 26. Preferably, granules 24 are homogeneously distributed within polymeric coating matrix 26 to provide uniform protection of substrate 22 from fire. Primer layer 23 can be any suitable priming composition, such as a polymerizable coating composition. Optionally, primer layer 23 can comprise metallic flakes or like materials to provide an additional fire protective aspect.

FIG. 3 is an edge view of a fire retardant coating system 30 of the present invention in place on a substrate 32. System 30 comprises primer layer 33 on substrate 32, with fire retardant coating 31 on primer layer 33. Fire retardant coating 31 comprises granules 34 distributed within polymeric coating matrix 36. As shown, fire-retardant system 30 comprises overcoat 38, that is a coating of a curable polymer on top of fire retardant coating 31. This overcoating advantageously provides a fire-retardant coating system that is resistant from environmental disturbances, such as physical brushing or adverse contact, rain, wind, etc. In a preferred embodiment, overcoat 38 is prepared from polymers selected from epoxy, polyester, polyurethane or polyurea polymers. Optionally, a plurality of overcoats can be provided.

FIG. 4 is an edge view of a fire retardant coating system 40 of the present invention in place on a substrate 42. System 40 is a fire retardant coating that comprises granules 44 distributed within polymeric coating matrix 46. System 40 additionally comprises graphite-containing intumescent fire retardant ingredient 49 distributed within polymeric coating matrix 46. Preferably, graphite-containing intumescent fire retardant ingredient 49 is homogeneously distributed within polymeric coating matrix 46 to provide uniform protection of substrate 42 from fire.

In preferred embodiments, Graphite-containing intumescent fire retardant ingredient 49 is selected from graphite-containing material, such as expandable graphite flake. Expandable graphite is commercially available from Nyacol Nano Technologies, Inc., Ashland, Mass., under the tradename NYACOL® NYAGRAPH and from Graftach, Cleveland, Ohio, under the tradename GRAFGUARD 220-80N.

Graphite-containing intumescent fire retardant ingredient 49 can preferably be present in an amount in the range from 1 to 15 weight percent based on the total weight of graphite-containing intumescent fire retardant ingredient 49, more preferably in an amount in the range from 5 to 10 weight percent based on the total weight of graphite-containing intumescent fire retardant ingredient 49. In a preferred embodiment, graphite-containing intumescent fire retardant ingredient 49 is broadcast or otherwise dispensed at the same time as or with granules 44. Because both graphite-containing intumescent fire retardant ingredient 49 and granules 44 may present clogging problems with some spray equipment, and/or may generate viscosity issues if premixed with certain coating compositions, dispensing of one or both of these components separate from the polymeric coating composition provides application benefits as well as final product configuration benefits.

FIG. 5 is an edge view of a fire retardant coating system 50 of the present invention in place on a substrate 52. System 50 comprises primer layer 53 on substrate 52, with fire retardant coating 51 on primer layer 53. Fire retardant coating 51 comprises granules 54 distributed within polymeric coating matrix 56. Primer layer 53 additionally comprises graphite-containing intumescent fire retardant ingredient 59 distributed therein. Preferably, graphite-containing intumescent fire retardant ingredient 59 is homogeneously distributed within primer layer 53 to provide uniform protection of substrate 52 from fire.

FIG. 6 is an edge view of a fire retardant coating system 60 of the present invention in place on a substrate 62. System 60 comprises primer layer 63 on substrate 62, with fire retardant coating 61 on primer layer 63. Fire retardant coating 61 comprises granules 64 distributed within polymeric coating matrix 66. As shown, fire-retardant system 60 comprises overcoat 68, that is a coating of a curable polymer on top of fire retardant coating 61. As shown, overcoat 68 additionally comprises graphite-containing intumescent fire retardant ingredient 69 distributed therein. Preferably, graphite-containing intumescent fire retardant ingredient 69 is homogeneously distributed within overcoat 68 to provide uniform protection of substrate 62 from fire. Optionally, a plurality of overcoats can be provided, with one or more overcoats comprising graphite-containing intumescent fire retardant ingredient.

FIG. 7 is an edge view of a fire retardant coating system 70 of the present invention in place on a substrate 72. System 70 is a fire retardant coating that comprises granules 74 adhered to substrate 72 by polymeric coating matrix 76. As shown, a large number of granules 74 are at least partially exposed, and are not fully entrained in polymeric coating matrix 76. This physical configuration can be achieved by any appropriate methodology as will be now apparent to the skilled artisan, such as by co-spraying the granules 74 with a relatively smaller amount of polymeric coating matrix 76 as compared to the system shown in FIG. 1 above. An alternative methodology is to first roll or spray polymeric coating matrix 76 onto substrate 72, followed by application of granules 74 by spray, broadcast or the like. Yet another alternative methodology is to co-spraying the granules 74 with relatively smaller amount of polymeric coating matrix 76, followed by water or solvent spray prior to cure of polymeric coating matrix 76 to expose the surfaces of granules 74.

Figure 8:
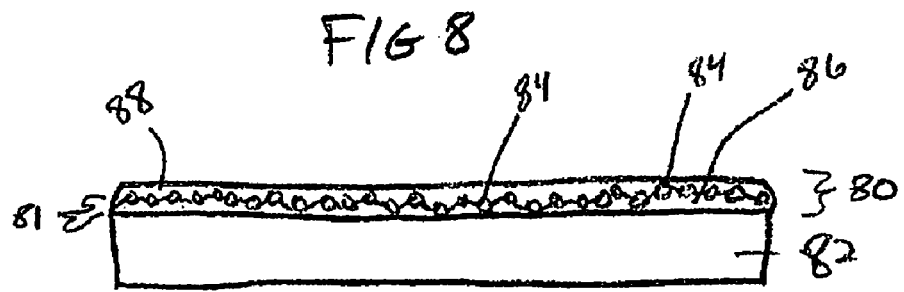
FIG. 8 is an edge view of an alternative fire retardant coating system of the present invention in place on a substrate.

FIG. 8 is an edge view of a fire retardant coating system 80 of the present invention in place on a substrate 82. System 80 comprises a fire retardant coating 81 that comprises granules 84 adhered to substrate 82 by polymeric coating matrix 86. As shown, a large number of granules 84 are at least partially exposed, and are not fully entrained in polymeric coating matrix 86 in the same manner as shown in the embodiment of FIG. 7 above. System 80 additionally comprises overcoat 88, that is a coating of a curable polymer on top of fire retardant coating 81.

It will now be appreciated that a plurality of one or more of the layers as described above may be applied as desired. For example, a primer can be applied to a substrate, followed by a layer of a fire retardant coating, followed by one or more overcoats, followed by an additional fire retardant coating, again followed by one or more overcoats.

All of the polymerizable compositions as described herein can desirably include additional ingredients that enhance the processing and/or handling of the composition or parts thereof (e.g., mixing the individual parts, mixing the parts together, applying two-part mixtures as a coating, and the like) and/or characteristics of the final cured composition. In general, it is desirable to incorporate the additional ingredients in a single polymerizable composition, or in one or both of the first and second parts of a two part polymerizable composition, so that fewer separate parts need to be handled prior to and at time of application of the curable composition and/or mixing of the two parts. Optionally, additional components can be added as a third part at time of use (i.e., at the time of mixing the first and second part).

Optionally, the polymerizable compositions can incorporate one or more additional ingredients in any of the parts thereof and/or to be included at time of application of the composition to the substrate in a manner as is understood in the art, such as, to help processing, coating, curing, and/or final cured composition properties. Such optional ingredients include, but are not limited to fillers, flow control agents, bubble control agents, free radical scavengers, ultraviolet light absorbers, fungicides, bacteriocides, dyes, pigments, aluminum flakes, reaction inhibitors, pot life extenders, biocides, mixtures thereof, etc.

For example, it can be highly desirable to optionally incorporate filler in polymerizable compositions. The filler can be incorporated into the polymerizable composition during initial manufacture off-site as a part of a one part system, or as an ingredient of either the first part and/or the second part of a two part system. Alternatively, the filler can be added at the time of application of the polymerizable compositions to the substrate on site. Useful filler includes organic and/or inorganic filler. Exemplary inorganic fillers include sand, titania, clay, silica, fumed silica, combinations thereof, etc. Exemplary organic filler includes PVC, polystyrene, polypropylene, polyethylene, other olefinic fillers, combinations thereof, and the like. Preferred fillers include polyolefinic material such as polyethylene beads and/or polypropylene beads. Polyolefinic beads are lightweight and help provide cured compositions with high chemical resistance and high abrasion.

Suitable pigments include titanium dioxide, phthalocyanine blue, carbon black, basic carbonate white lead, zinc oxide, zinc sulfide, antimony oxide, zirconium oxide, lead sulfochromate, bismuth vanadate, bismuth molybdate, combinations thereof, etc.

The coating compositions can optionally comprise an additional fire retardant ingredient that is not disposed within the granule. Preferred such additional fire retardant ingredients possess intumescent characteristics. Particularly preferred such additional fire retardant ingredients comprise a graphite-containing material, such as an expandable graphite flake.

The present invention in particular is beneficial because the fire-retardant coating can be applied to almost any surface, including metal, wood, fibrous material, plaster, glass, fiberglass and so forth. Additionally, the fire-retardant coating can be applied to surfaces having almost any configuration, including vertical surfaces, ceilings, curves surfaces, and so on.

In one embodiment, the material to be coated is a honeycomb structure, such as disclosed in U.S. Pat. No. 6,753,061. In one embodiment, the open cells of a honeycomb structure are filled with granules with or without the coating composition as described herein. In an embodiment of the invention, the open cell is filled with granules and an overlaminate is applied over the top of the cells to retain the granules therein. Optionally, the overlaminate may also comprise a fire retardant. In another embodiment, the honeycomb structure is provided with a continuous backing layer, and the back-side of the backing layer (i.e. the side opposite the honeycomb structure) is coated with the granule-containing coating as described herein. The honeycomb material may be formulated from any desired material, such as polypropylene, fiberglass, aluminum and the like.

In one embodiment, the present system can be applied to a substrate in a factory setting, wherein the coating can take place under controlled environmental conditions. The thus coated structure is then transported to the location of ultimate use, and optionally subsequent coatings can be applied thereto at the site of use. In a preferred embodiment, the coating system is transported to the location of ultimate use of the structure to be coated for application on site. This embodiment is particularly advantageous, because very large and/or difficult to move substrates can be provided with exceptional fire protection by a process that can be carried out by workers using conventional equipment and methods.

In order to facilitate the transport of the coating system of the present invention to the site of use, a polymeric fire retardant coating kit is preferably provided. The kit comprises a first component that is a coatable polymeric coating composition; and, as a discreet composition, a second component comprising granules, wherein the granules comprise a polymeric matrix comprising a plurality of regions of fire retardant material ingredient incorporated therein. This system is at least a two part kit having the first component and the second component provided as separate compositions as delivered to the site of application.

In a preferred embodiment, the first component of the kit is a two part sprayable polymeric coating composition. In another preferred embodiment, the first component of the kit is a one part sprayable, rollable, or brush applied polymeric coating composition.

Thus, the present fire-retardant coating of the present invention is ideal for use in commercial buildings, banks, computer storage locations, chemical plants, tunnels or bridges, vehicle (such as automotive or train) undercarriages, planes, space vehicles, or any place/structure that would benefit from a very effective solution for protection from fire damage. Specific applications contemplated include providing coatings for electrical poles, railroad ties and communication towers.

After application of the coating system of the present invention, the coating may be provided with an additional topcoat for protective or aesthetic purposes. Examples of topcoat compositions include urethane or silicone topcoat materials.

The system and methods of the present invention provide substantial and surprising benefit in providing a uniquely effective fire protection, and/or bomb and impact mitigation for structures or surfaces.

As an additional benefit, the system of the present invention may be formulated and configured to provide substantial waterproofing benefits, as well and fire retardancy benefits. Thus, coating compositions of the present invention provide exceptional benefit for providing fireproofing and waterproofing for use in areas prone to natural disasters.

Additionally, the present coating system can provide substantial scrub resistance and durability because the fire retardant granules present a durable and skid resistant surface.

Because the fire-retardant coating can comprise colorants, the resulting coating can be provided in virtually and desired color, which provides benefit from an aesthetic point of view. Additionally, by use of overcoats as discussed above, the surface appearance of the fire-retardant coating can be varied to present a highly textured surface or a smooth surface, as desired for the particular application.

The fire-retardant coating of the present invention exhibits exceptional fire protection properties. In evaluation, a torch is directed to a sample that has been provided with a fire-retardant coating. The coating itself is at least partially destroyed under this test, but provides excellent protection of the underlying substrate. After cooling, the substrate can be easily rehabilitated by simply scraping off the damaged portion of the coating and applying another layer of coating in its place. This performance and methodology thus provides a very fast and simple way to re-apply the surface with fire-retardant system.

EXAMPLES

Representative embodiments of the present invention will now be described with reference to the following examples that illustrate the principles and practice of the present invention.

Granules Preparation

TABLE I

| RAW MATERIALS | Example 1 | Example 2 | Example 3 | Example 4 | Example 5 |
|---|---|---|---|---|---|
| PC-260 (mixture of two components) Polycoat Products Santa Fe Springs, CA 90670 | 30 | 30 | 30 | 30 | 30 |
| Titanium Dioxide(,Pigment) Dupont Chemicals Wilmington, DE 19898 | 10 | 10 | 10 | 10 | 10 |
| Disperplast1142 (Dispersing Agent) BYK Chemical Wallingford, CT 06492 | 0.5 | 0.5 | 0.5 | 0.5 | 0.5 |
| Tinuvin 292 (Hindered Amine Light Stablizer) | 0.3 | 0.3 | 0.3 | 0.3 | 0.3 |

TABLE I-continued

| RAW MATERIALS | Example 1 | Example 2 | Example 3 | Example 4 | Example 5 |
|---|---|---|---|---|---|
| Ciba Speciality Chemicals Corp Tarrytown, NY 10591 | | | | | |
| Tinuvin 1130 (UV Absorber Light Stabilizer) Ciba Speciality Chemicals Corp Tarrytown, NY 10591 | 0.1 | 0.1 | 0.1 | 0.1 | 0.1 |
| APP-101 (Ammonium Poly Phosphate) JLS Chemicals Pomona, CA 91768 | 60 | 30 | 30 | — | — |
| SB-332 (Alumina tri hydrate) J.M. Huber Corp Fairmont, GA 30139 | — | 30 | — | 60 | 30 |
| Vicron 1515 (Calcium Carbonate) Speciality Minerals Inc Lucerne Valley, CA 92356 | — | — | 30 | — | 30 |

PC-260 is a curable two components coating which consists of NCO terminated one component and amine/hydroxyl terminated first component.

Procedure of Making the Granules:
1. Grind titanium in NCO terminated one component of PC-260
2. Add dispersing agent and light stabilizer, then disperse APP 101 or SB 332 or Calcium Carbonate or their combination
3. Allow the sample to cool down to 80-95 F, then add amine/hydroxyl terminated component of PC 260 and spread the material to make a thin sheet of 80 mil (2 mm)
4. Cure the sheet for a day and then cut the same into appropriate granule size.

Roofing System Assembly:

This roofing system is a liquid applied, moisture cured, fire retardant, urethane waterproof system. The system utilizes an epoxy primer, one coat of a water catalyzed urethane base coat, second light coat of a water catalyzed urethane base coat with fire retardant granules and one or two coats of an aliphatic urethane topcoat on wood and oriented strand board ("OSB") substrate. The size of the sample assembly is 6"×12".

Roofing System Preparation

TABLE II

| RAW MATERIALS | Example 6 | Example 7 | Example 8 | Example 9 | Example 10 | Example 11 (Control Sample) |
|---|---|---|---|---|---|---|
| Primer 2180 Polycoat Products Santa Fe Springs, CA 90670 | 1 gal/300 sq.ft. | 1 gal/300 sq.ft. | 1 gal/300 sq.ft. | 1 gal/300 sq.ft | 1 gal/300 sq.ft | 1 gal/300 sq.ft |
| E-Tuff™ Polycoat Products Santa Fe Springs, CA 90670 | 3 gal/100 sq.ft. | 3 gal/100 sq.ft. | 3 gal/100 sq.ft. | 3 gal/100 sq.ft. | 3 gal/100 sq.ft. | 3 gal/100 sq.ft. |
| E-Tuff™ Polycoat Products Santa Fe Springs, CA 90670 | 1 gal/100 sq.ft. | 1 gal/100 sq.ft. | 1 gal/100 sq.ft. | 1 gal/100 sq.ft. | 1 gal/100 sq.ft. | 1 gal/100 sq.ft. |
| Broadcast Aggregate | Example 1 | Example 2 | Example 3 | Example 4 | Example 5 | Sand 16 mesh (ABC Construction Specialities Fullerton CA 92831 |
| Polyglaze 100 Polycoat Products Santa Fe Springs, CA 90670 | 1 gal/100 sq.ft. | 1 gal/100 sq.ft. | 1 gal/100 sq.ft. | 1 gal/100 sq.ft. | 1 gal/100 sq.ft. | 1 gal/100 sq.ft. |
| Polyglaze 100 Polycoat Products Santa Fe Springs, CA 90670 | 0.5 gal/100 sq.ft. | 0.5 gal/100 sq.ft. | 0.5 gal/100 sq.ft. | 0.5 gal/100 sq.ft. | 0.5 gal/100 sq.ft. | 0.5 gal/100 sq.ft. |

Primer 2180 is a two component epoxy-amine primer. E-Tuff™ is a water catalyzed polyurethane/polyurea coating. Polyglaze 100 is a moisture cure aliphatic topcoat. These are all manufactured by Polycoat Products.

Procedure for Preparing the Roofing Assembly:

Step 1: Primed the surface with Polyprime 2180 at a rate of 1 gallon/300 sq.ft, applying the primer with a phenolic core roller. Allowed the primer to become tack free, which took around 1.5-2 hrs. @ 72° F. and R.H. 57%.

Step 2: Applied E-Tuff™ at a rate of 3 gallons/100 sq.ft. Used a notched trowel to spread E-Tuff™ evenly over the sample surface. Allowed to cure for at least 2 hrs. before applying second coat of E-Tuff™.

Step 3: Applied second coat of E-Tuff™ at a rate of 1 gallon/100 sq.ft. While this coat was still wet, broadcast the fire retardant granules/sand to refusal, which resulted in a coating weight of 34 lbs/100 sq.ft. in the case of granules and 65 lbs/100 sq.ft. in the case of sand.

Step 4: Applied white Polyglaze 100 at a rate of 1 gallon/100 sq.ft. and waited until the coating was tack free.

Step 5: Then applied white Polyglaze 100 at a rate of 0.5 gallon/100 sq.ft.

Samples 6-10 as applied to both wood and OSB substrates are shown in FIG. 9, which is a color photograph, prior to application of the topcoats of Steps 4 and 5.

Testing of the Samples

The samples were tested using Propane torch (Bernzomatic TS 4000, Bernzomatic Propane gas cylinder TX 9, both made by Newell Rubbermaid, Medina N.Y. 14103). The samples were positioned at a 5:12 pitch, and distance between the sample and nozzle of the torch was kept at 3 inches. The samples were burnt for about 5 minutes in outdoors.

The climatic conditions were sunny with mild wind, temperate at around 69 F and R.H. of 54%.

Results

TABLE III

| Substrate | Example 6 | Example 7 | Example 8 | Example 9 | Example 10 | Example 11 (Control Sample) |
|---|---|---|---|---|---|---|
| Wood | While burning, smoke was white; granules were charred and swelled up. Edges of the sample burned as the charred material sagged down. Fire did not penetrate below primer | While burning smoke was white, granules were charred and swelled up. Around 2-2½ min. the charred material sagged down and around 4 min. black smoke can be seen as the flame reached the wood and the burned spot is visible. | White smoke while burning and granules were charred but there was no sagging and flame created a hole in the charred structure and wood started burning in 5 min. | Black smoke and granules melted and started flowing down within 1 min. Fire penetrated through the coating and wood started burning within 2 min. | Black smoke and granules melted and started flowing down within 1 min. Fire penetrated through the coating and wood started burning within 2 min. | The smoke was black while burning. After around 3½ min., the wood started burning. After 4 minutes, the flames penetrated though the wood. |
| OSB | While burning, smoke was white; granules were charred and swelled up. The charred material sagged down. Fire did not penetrate below primer | While burning smoke was white, granules were charred and swelled up. The charred material sagged down around 4½ min. At the bottom primer was intact | White smoke while burning and granules were charred but there was no sagging and flame created a hole in the charred structure and OSB board started burning in 5 min | Black smoke and granules melted and started flowing down within 1 min. Fire penetrated through the coating and OSB board started burning within 2 min. | Black smoke and granules melted and started flowing down within 1 min. Fire penetrated through the coating and OSB board started burning within 2 min. | |
| Remarks | Best Performance | Good | Average | Not Recommended | Not Recommended | Not Recommended |

The test results are shown in color photographs as follows:

FIG. 10 is a color photograph of a flame test of the fire retardant coating system of Example 6.

Figure 11:
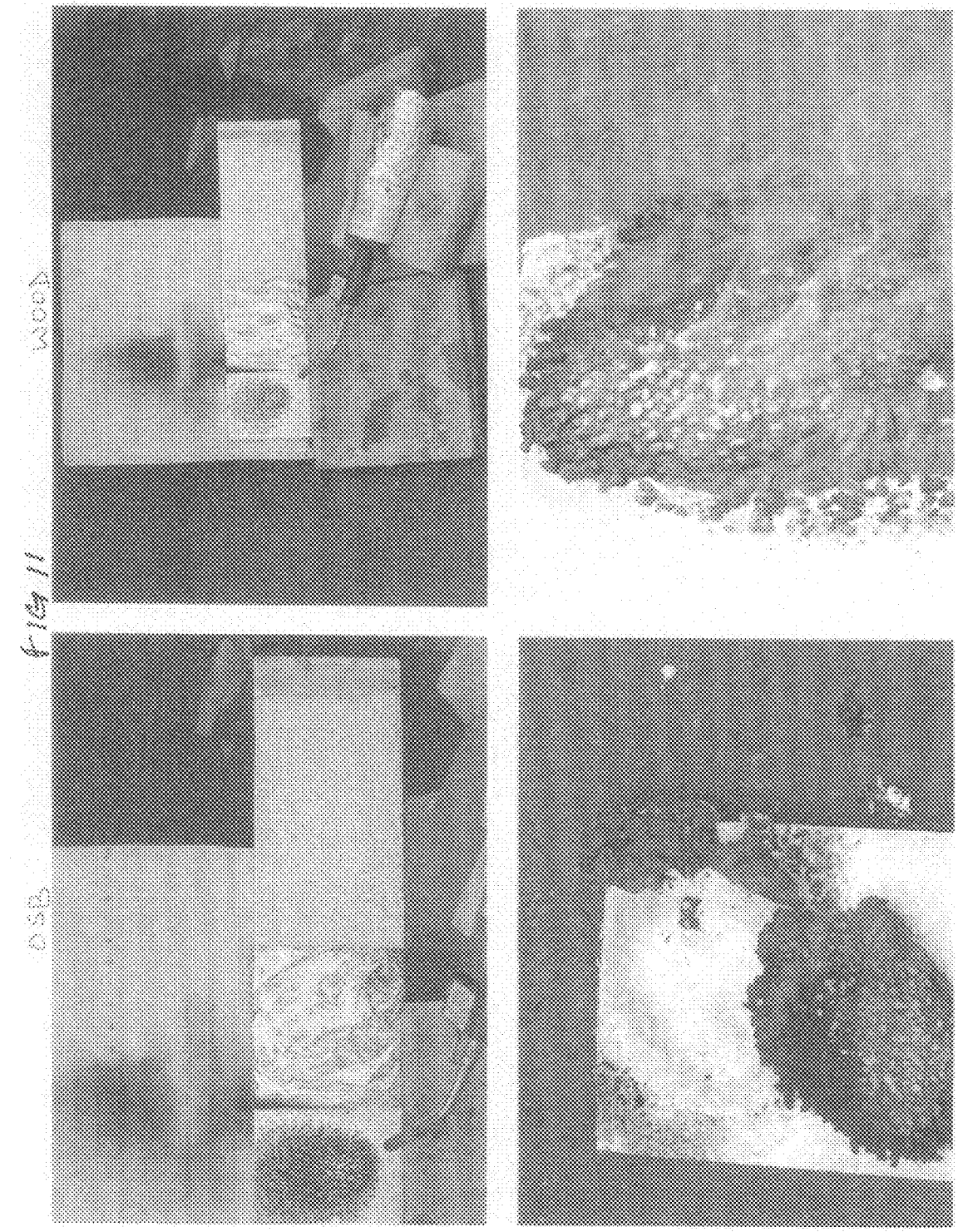
FIG. 11 is a color photograph of a flame test of the fire retardant coating system of Example 7.

FIG. 11 is a color photograph of a flame test of the fire retardant coating system of Example 7.

Figure 12:
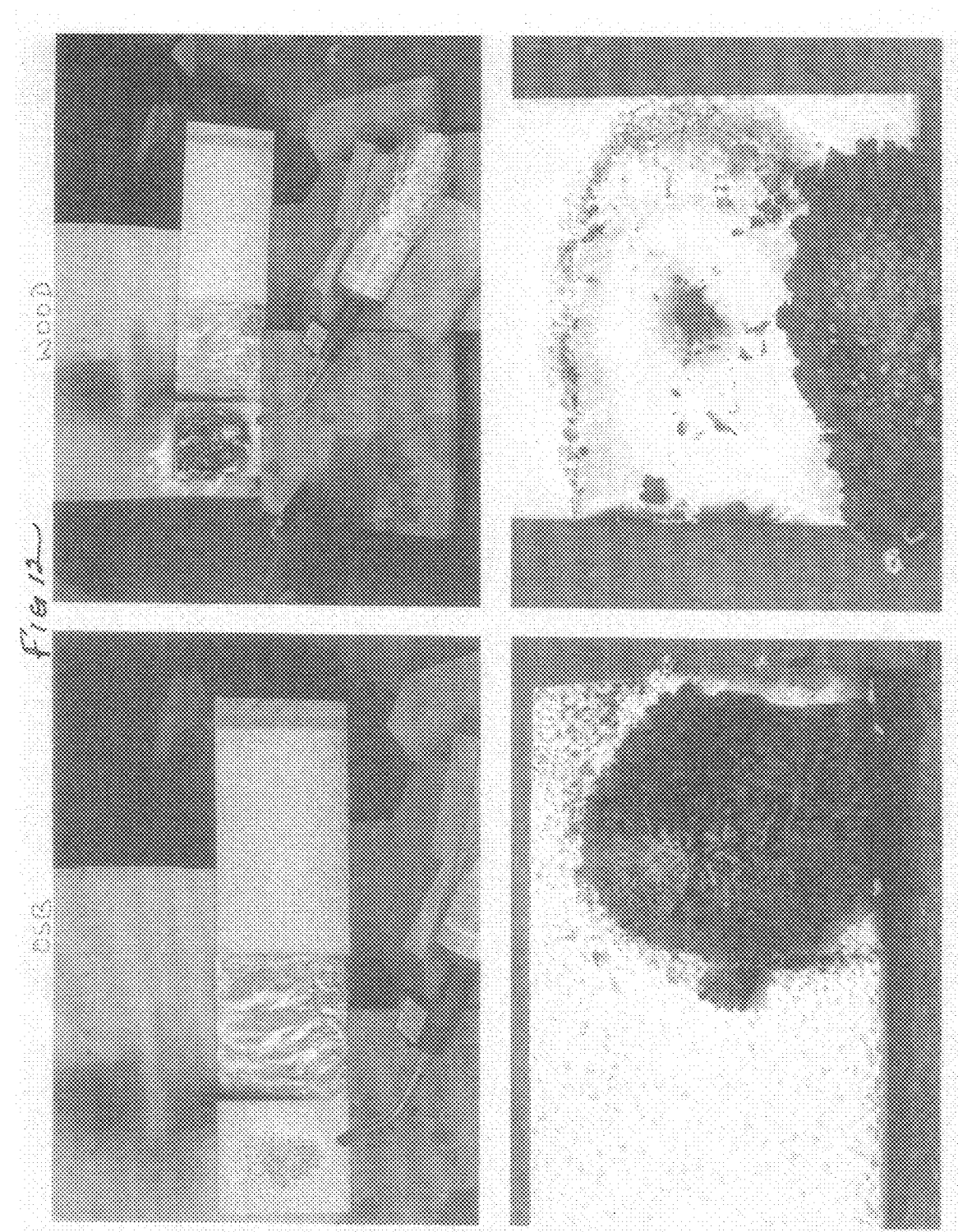
FIG. 12 is a color photograph of a flame test of the fire retardant coating system of Example 8.

FIG. 12 is a color photograph of a flame test of the fire retardant coating system of Example 8.

Figure 13:
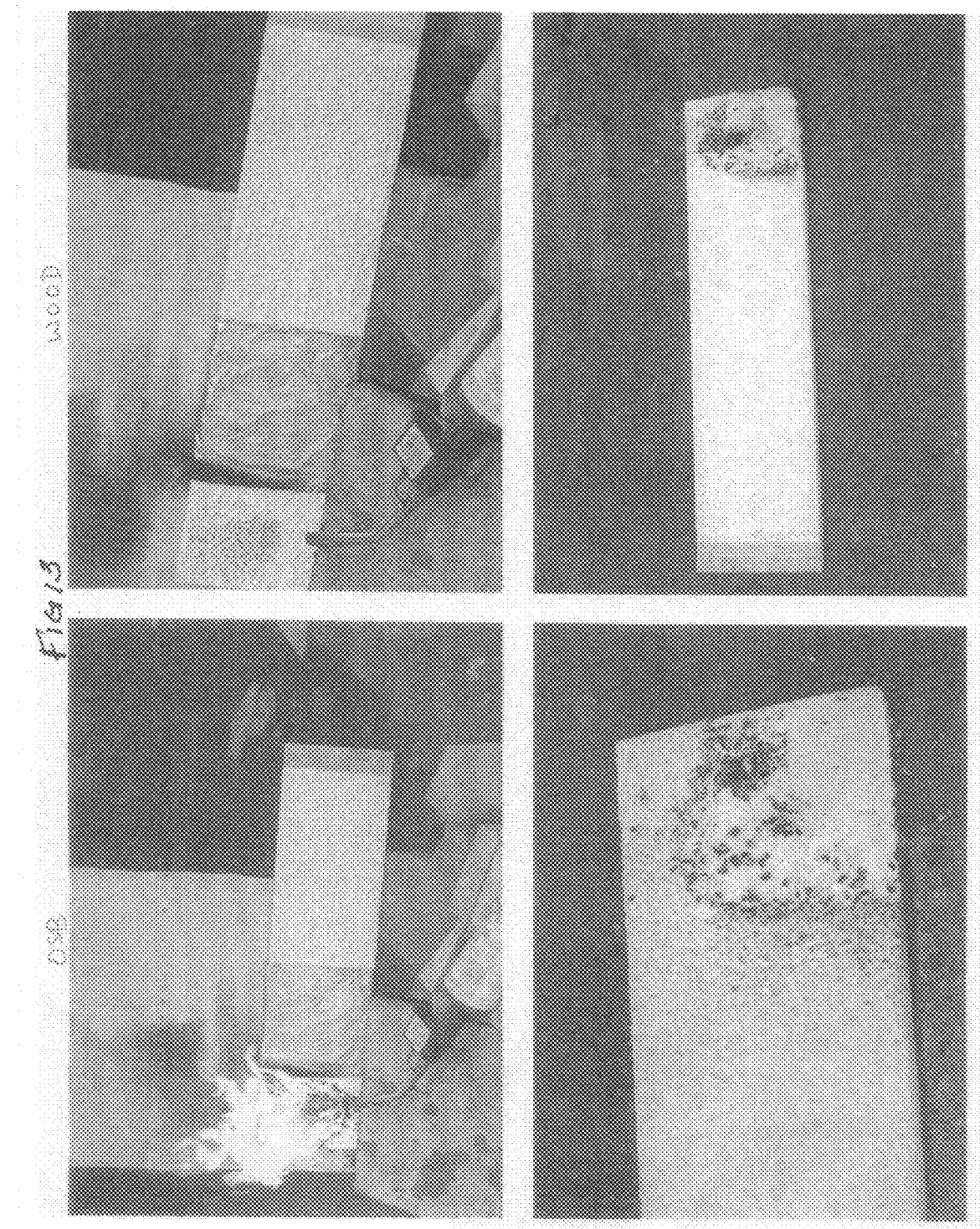
FIG. 13 is a color photograph of a flame test of the fire retardant coating system of Example 9.

FIG. 13 is a color photograph of a flame test of the fire retardant coating system of Example 9.

Figure 14:
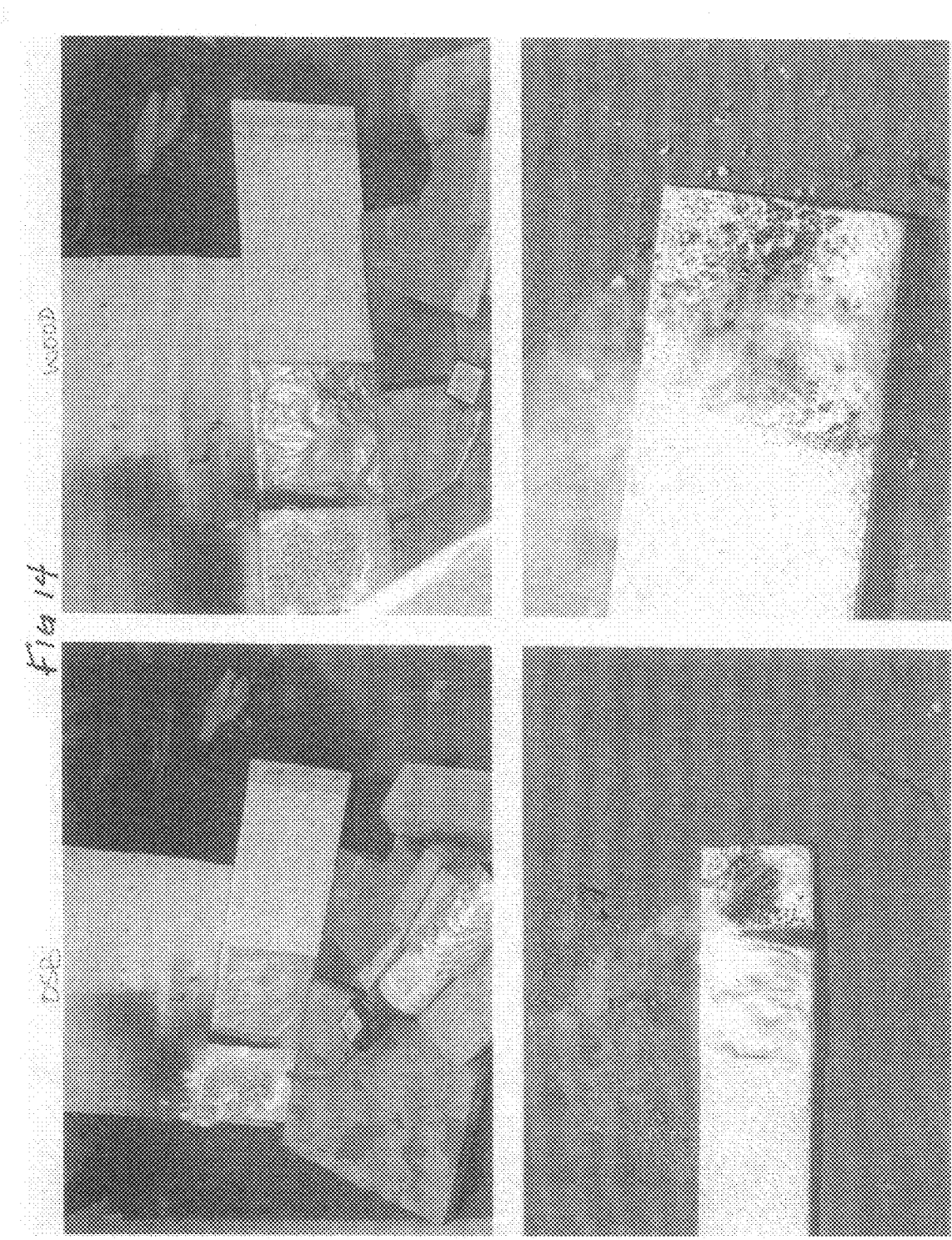
FIG. 14 is a photograph of a flame test of the fire retardant coating system of Example 10.

FIG. 14 is a photograph of a flame test of the fire retardant coating system of Example 10.

It will be noted that even though the sample was exposed to fire while at a 5:12 pitch, the fire retardant coating of the present invention did not flow during application of flame.

Figure 15:
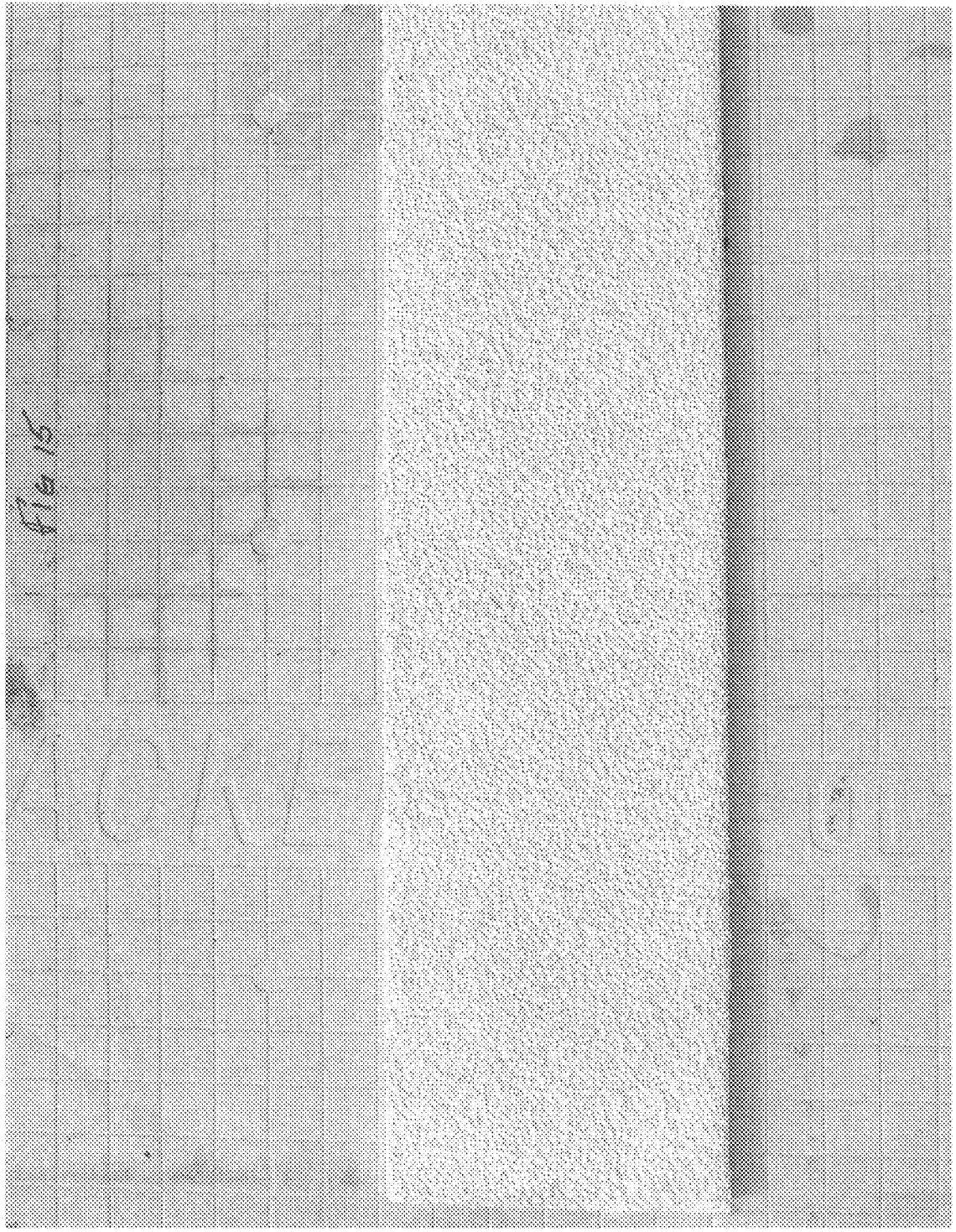
FIG. 15 is a color photograph of a sample coated with a control coating prior to flame testing.
Figure 16:
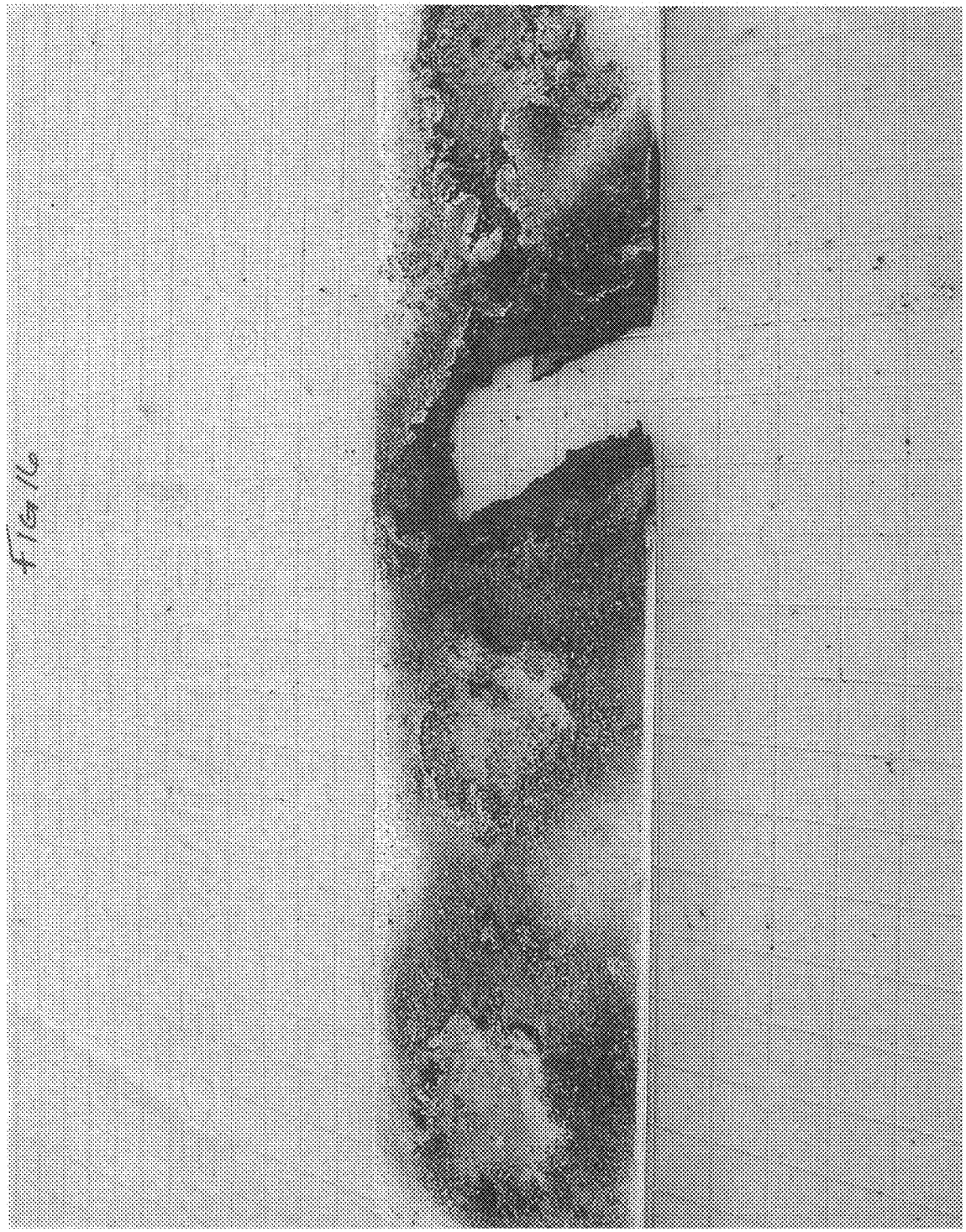
FIG. 16 is a color photograph of a sample coated with a control coating after flame testing.

In comparison, a wood substrate was coated with a control coating using the same polymer system as in Examples 6-10 except that sand was substituted for the granules. This product afforded virtually no fire protection. FIG. 15 is a color photograph of a sample coated with a control coating prior to flame testing. FIG. 16 is a color photograph of a sample coated with a control coating after flame testing.

Additional Granules were prepared from EP Rubber (Vistalor 404) by mixing the ingredients as indicated are mixed and formed into sheets 2 mm thick.

The sheets are autoclaved for 180 minutes at 330° F. The resulting cured material is ground into 10-16 mesh size rubber granules.

TABLE IV

| | Example #13 | Example #1 L | Example #14 | Example #15 | Example #16 | Example #17 |
|---|---|---|---|---|---|---|
| Reference Book # | Y02-1304 | | Y02-1305 | Y02-1306 | Y02-1307 | Y02-1308 |
| Vistalon 404 | 27.81 | | 27.81 | 27.81 | 27.81 | 27.81 |
| Butyl Rubber | | | | | | |
| TPO Rubber | | | | | | |
| PU melathane 66 | | | | | | |
| Fillers: | | | | | | |
| TiO2* | 9.91 | | 9.91 | 9.91 | 9.91 | 9.91 |
| APP (melamine coated)* | 59.48 | | 29.74 | 29.74 | | |
| ATH | | | 29.74 | | | 59.48 |
| Zinc Borate | | | | 29.74 | | |
| CaCO3 | | | | | | |
| Chlorinated Paraffin (70% Solid) | | | | | | |
| Deca Bromo P Flame Retardant | | | | | | |
| Melamine Powder | | | | | 59.48 | |
| UV Stabilizer* | 0.40 | | 0.40 | 0.40 | 0.40 | 0.40 |
| Color* | 0.20 | | 0.20 | 0.20 | 0.20 | 0.20 |
| Ryvec color | Blue 312 | | Blue 302 | Yellow 601 | Tan 750 | Orange 612 |
| VC-60P (peroxide) | 1.40 | | 1.40 | 1.40 | 1.40 | 1.40 |
| Carbowax 3350 | 0.79 | | 0.79 | 0.79 | 0.79 | 0.79 |
| Total | 100.00 | | 100.00 | 100.00 | 100.00 | 100.00 |
| Physical Properties | | | | | | |
| Tensile Strength (Psi) | 160.00 | | 310.00 | 256.00 | 299.00 | 383.00 |
| % Elongation | 293.00 | | 415.00 | 297.00 | 383.00 | 440.00 |
| Hardness (Shore A) | 80.00 | | 73.00 | 78.00 | 80.00 | 71.00 |
| Maximum Torque, MH, lbf · inch[1] | 104.34 | | 61.68 | 64.81 | 30.46 | 56.18 |
| Maximum Torque, ML, lbf · inch | 10.58 | | 11.00 | 10.17 | 7.81 | 11.58 |
| Scorch Time, ts2, minutes | 19.55 | | 17.47 | 16.84 | 12.38 | 10.35 |
| Cure Time, t50, minutes | 6.96 | | 5.78 | 6.19 | 5.54 | 4.61 |
| Cure Time, t90, minutes | 1.32 | | 1.31 | 1.33 | 1.74 | 1.03 |

| | Example #18 | Example #19 | Example #20 | Example #21 | Example #22 |
|---|---|---|---|---|---|
| Reference Book # | Y02-1309 | Y02-1310 | Y02-1311 | Y02-1312 | Y02-1313 |
| Vistalon 404 | 27.81 | 27.81 | | | |
| Butyl Rubber | | | 26.21 | | |
| TPO Rubber | | | | 27.00 | |
| PU melathane 66 | | | | | 26.21 |
| Fillers: | | | | | |
| TiO2* | 9.91 | 9.91 | 9.62 | 9.91 | 9.62 |
| APP (melamine coated)* | | | 57.77 | 59.50 | 57.77 |
| ATH | 9.91 | 9.91 | | | |
| Zinc Borate | | | | | |
| CaCO3 | | | | | |
| Chlorinated Paraffin (70% Solid) | 49.57 | | | | |
| Deca Bromo P Flame Retardant | | 49.57 | | | |
| Melamine Powder | | | | | |
| UV Stabilizer* | 0.40 | 0.40 | 0.38 | 0.39 | 0.38 |
| Color* | 0.20 | 0.20 | 0.19 | 0.20 | 0.19 |
| Ryvec color | Orange 610 | Red 422 | Orange 604 | Black 218 | Brown 702 |
| VC-60P (peroxide) | 1.40 | 1.40 | 2.91 | 3.00 | 2.91 |
| Carbowax 3350 | 0.79 | 0.79 | 2.91 | | 2.91 |
| Total | 100.00 | 100.00 | 100.00 | 100.00 | 100.00 |

TABLE IV-continued

| Physical Properties | | | | | |
|---|---|---|---|---|---|
| Tensile Strength (Psi) | — | 404.00 | 124.00 | 727.00 | 365.00 |
| % Elongation | — | 424.00 | 46.00 | 195.00 | 241.00 |
| Hardness (Shore A) | — | 65.00 | 72.00 | 98.00 | 89.00 |
| Maximum Torque, MH, lbf · inch[1] | — | 27.82 | 18.28 | 128.08 | 116.17 |
| Maximum Torque, ML, lbf · inch | — | 7.77 | 7.63 | 1.05 | 9.33 |
| Scorch Time, ts2, minutes | — | 11.66 | 1.12 | 1.05 | 0.65 |
| Cure Time, t50, minutes | — | 5.22 | 2.00 | 3.13 | 1.84 |
| Cure Time, t90, minutes | — | 1.76 | 5.30 | 6.42 | 2.99 |

[1]Rheometer data is determined in accordance with ASTM D 2084-95, using a Tech Pro rheo Tech ODR 330F, 30 are, 100 inch 0bs (torque range) 60 minute chart speed, 100 cpm.

TABLE V

| | Example #23 | Example #24 | Example #25 | Example #26 | Example #27 |
|---|---|---|---|---|---|
| Reference Book # | Y02-2301 | Y02-2302 | Y02-2303 | Y02-2304 | Y02-2305 |
| Vistalon 404 | 29.26 | 29.26 | 29.26 | 29.26 | 29.26 |
| Fillers: | | | | | |
| TiO2* | 4.83 | 4.83 | 4.83 | 4.83 | 4.83 |
| APP (melamine coated)* | 62.84 | 48.33 | 39.67 | 45.46 | 51.26 |
| Melamine Powder | | 14.51 | 11.59 | 11.59 | |
| Dipentaerythritol Powder | | | 11.59 | 5.79 | 11.59 |
| UV Stabilizer* | 0.38 | 0.38 | 0.38 | 0.38 | 0.38 |
| Color* | 0.19 | 0.19 | 0.19 | 0.19 | 0.19 |
| Ryvec color | Blue312 | Orange612 | Yellow681 | Red422 | Brown702 |
| Polyethylene Glycol | 0.88 | 0.88 | 0.88 | 0.88 | 0.88 |
| VC-60P (peroxide) | 1.63 | 1.63 | 1.63 | 1.63 | 1.63 |
| Total | 100.00 | 100.00 | 100.00 | 100.00 | 100.00 |
| Physical Properties | | | | | |
| Tensile Strength (Psi) | 400.00 | 322.00 | 153.00 | 150.00 | 272.00 |
| % Elongation | 327.00 | 296.00 | 101.00 | 163.00 | 319.00 |
| Hardness (Shore A) | 80.00 | 80.00 | 80.00 | 80.00 | 80.00 |
| Maximum Torque, MH, lbf · inch | 77.31 | 76.55 | 69.70 | 68.56 | 64.56 |
| Maximum Torque, ML, lbf · inch | 18.02 | 15.14 | 9.65 | 11.52 | 12.44 |
| Scorch Time, ts2, minutes | 2.41 | 1.88 | 2.04 | 2.19 | 2.58 |
| Cure Time, t50, minutes | 13.63 | 15.44 | 14.02 | 14.34 | 14.48 |
| Cure Time, t90, minutes | 35.11 | 40.77 | 37.08 | 38.41 | 37.14 |

Additional granules were prepared from a two part urethane elastomer by the following process:

Titanium is ground into PC-260 A-SIDE, and fire retardant powder/combination and additives are then dispersed in this composition. The sample is allowed to cool to 80-95°F., and PC-260 B-SIDE is added and the combined material is spread to make a thin sheet of 80 mil (2 mm). The sheet is cured for a day and then cut into 16/20 mesh granule size.

Specific compositions are as indicated in Table VI:

TABLE VI

| | Example #28 | Example #29 |
|---|---|---|
| Reference Book # | Y02-4901 | Y02-4902 |
| B-TUFF 306 (mixed) | 29.73 | 29.73 |
| Fillers: | | |
| TiO2* | 9.91 | 9.91 |
| APP (melamine coated)* | | 59.46 |
| APP | 59.46 | |
| UV Stabilizer* | 0.90 | 0.90 |
| Total | 100.00 | 100.00 |
| Physical Properties | | |
| Tensile Strength (Psi) | 279.00 | 403.00 |
| % Elongation | 105.00 | 30.00 |
| Hardness (Shore A) | 88.00 | 90.00 |

Fire retardant systems (i.e. combinations of substrates, coatings, granules and topcoats) were prepared for evaluation as follows:

Step 1: Applied E-Tuff* at a rate of 3 gallons/100 sq.ft. Used a notched trowel to spread E-Tuff evenly over the sample surface. Allowed to cure for at least 2 hrs. before applying second coat of E-Tuff.

Step 2: Applied second coat of E-Tuff at a rate of 1 gallon/100 sq.ft.

Step 3: While this coat is still wet broadcast the fire retardant granules/sand to refusal which came out 22 lbs/100 sq.ft. in case of granules and 65 lbs/100 sq.ft. in case of sand.

Step 4: Applied Polyglaze 100 White with hardener at a rate of 1 gallon/100 sq.ft. and wait till it gets tack free.

Step 5: Then apply Polyglaze 100 White at a rate of 1 gallon/100 sq.ft.

The systems so prepared are described in Table VII:

Step 3: Broadcast the aggregate to refusal. Wait for 24 hours.
Step 4: Applied Polyglaze 100 White with hardener at a rate of 1 gallon/100 sq.ft. and wait till it gets tack free.

TABLE VII

FIRE RETARDANT SYSTEMS WITH DIFFERENT EXAMPLES OF GRANULES

| System # | Reference Book # | 1$^{st}$ BASECOAT Step #1 3 gal/100 sq.ft. | 2$^{nd}$ BASECOAT Step #2 1 gal/100 sq.ft. | AGGREGATE Step #3 granules (Average 22 lbs./100 sq.ft.) (with hardener) | 1$^{st}$ TOPCOAT Step #4 1 gal/100 sq.ft. | 2$^{nd}$ TOPCOAT Step #5 1 gal/100 sq.ft. |
|---|---|---|---|---|---|---|
| 1 | Y02-3501 | E-TUFF with water and catalyst | E-TUFF with catalyst only | EXAMPLE 13 | PG-100 WHITE | |
| 2 | Y02-3503 | | | EXAMPLE 14 | PG-100 WHITE | |
| 3 | Y02-3505 | | | EXAMPLE 15 | PG-100 WHITE | |
| 4 | Y02-3507 | | | EXAMPLE 16 | PG-100 WHITE | |
| 5 | Y02-3509 | | | EXAMPLE 17 | PG-100 WHITE | |
| 6 | Y02-3511 | | | EXAMPLE 18 | PG-100 WHITE | |
| 7 | Y02-3513 | | | EXAMPLE 19 | PG-100 WHITE | |
| 8 | Y02-3515 | | | EXAMPLE 20 | PG-100 WHITE | |
| 9 | Y02-3516 | | | EXAMPLE 21 | PG-100 WHITE | |
| 10 | Y02-3517 | | | EXAMPLE 22 | PG-100 WHITE | |
| 11 | Y02-3518 | | | EXAMPLE 13 (LIGHT) | PG-100 WHITE | |
| 12 | Y02-5103 | | | EXAMPLE 28 | PG-100 WHITE | |
| 13 | Y02-5106 | | | EXAMPLE 29 | PG-100 WHITE | |

Similarly, alternative fire retardant systems were prepared for evaluation as follows:

SYSTEM DESCRIPTION: (System #14 to 25)
Step 1: Stapled metal lath to the 1'×1', ⅝" thick plywood.
Step 2: Applied base coat as following.
  E-Tuff mixed membrane —4 part E-tuff and 1 part water by volume. Add catalyst @ 30 ml per 5 gallon of E-Tuff.
  Sand Slurry —1 part E-Tuff mixed membrane and 1 part 20 mesh washed, dried, rounded, 6.5+ Moh's minimum hardness sand by volume.
  Granules/Powder Slurry—1 part E-Tuff mixed membrane and 1 part Example #1 granules/powder by volume.
  Granules/Powder Slurry (L)—1 part E-Tuff mixed membrane and 1 part Example #1 (L) granules/powder by volume.
  Granules Slurry (16)—1 part E-Tuff mixed membrane and 1 part Example #16 granules by volume.
  Granules Slurry (17)—1 part E-Tuff mixed membrane and 1 part Example #17 granules by volume.
Applied base coat at a rate of 7.5 gallon/100 square feet. Wait for 30 minutes.

Step 5: Then apply Polyglaze 100 White at a rate of 1 gallon/100 sq.ft.

NOTE:

L denotes light.

E-TUFF: COMMERCIALLY AVAILABLE PRODUCT FROM PSI, mixed E-Tuff comprises of E-Tuff and water in the ratio of 4:1 by volume and catalyst 30 ml/5 gal. of E-Tuff.

PG-100 WHITE: COMMERCIALLY AVAILABLE PRODUCT FROM POLYCOAT PRODUCTS.

B-TUFF 306: COMMERCIALLY AVAILABLE PRODUCT FROM PSI, mixed B-Tuff comprises of B-Tuff A-Side and B-Tuff B-side in the ratio of 4:1 by volume.

PRIMER 21: COMMERCIALLY AVAILABLE PRODUCT FROM POLYCOAT PRODUCTS, A-Side and B-Side in the ratio of 2:1 by volume ratio of 4:1 by volume.

The systems so prepared are described in Table VIII:

TABLE VIII

FIRE RETARDANT SYSTEMS WITH GRANULES FROM AKRON LAB

| System# | Reference book# (with lath) | BASECOAT Step #2 7.5 gal/100 sq.ft. | AGGREGATE Step #3 granules (Average 22 lbs./100 sq.ft.) | 1st TOPCOAT Step #4 1 gal/100 sq.ft. (with hardener) | 2nd TOPCOAT Step #5 1 gal/100 sq.ft. |
|---|---|---|---|---|---|
| 14 | Y02-3519 | Sand slurry | (EXAMPLE #13) | PG-100 WHITE | |
| 15 | Y02-3520 | Sand slurry | (EXAMPLE #13 L) | PG-100 WHITE | |
| 16 | Y02-3521 | Powder slurry | (EXAMPLE #13) | PG-100 WHITE | |
| 17 | Y02-3522 | Powder slurry | (EXAMPLE #13 L) | PG-100 WHITE | |
| 18 | Y02-3523 | Granules slurry | (EXAMPLE #13) | PG-100 WHITE | |
| 19 | Y02-3524 | Granules slurry | (EXAMPLE #13 L) | PG-100 WHITE | |
| 20 | Y02-3525 | Powder slurry (L) | (EXAMPLE #13) | PG-100 WHITE | |

TABLE VIII-continued

FIRE RETARDANT SYSTEMS WITH GRANULES FROM AKRON LAB

| System# | Reference book# (with lath) | BASECOAT Step #2 7.5 gal/100 sq.ft. | AGGREGATE Step #3 granules (Average 22 lbs./100 sq.ft.) | 1st TOPCOAT Step #4 1 gal/100 sq.ft. (with hardener) | 2nd TOPCOAT Step #5 1 gal/100 sq.ft. |
|---|---|---|---|---|---|
| 21 | Y02-3526 | Powder slurry (L) | (EXAMPLE #13 L) | PG-100 WHITE | |
| 22 | Y02-3527 | Granules slurry (L) | (EXAMPLE #13) | PG-100 WHITE | |
| 23 | Y02-3528 | Granules slurry (L) | (EXAMPLE #13 L) | PG-100 WHITE | |
| 24 | Y02-5102 | Granules slurry (16) | (EXAMPLE #28) | PG-100 WHITE | |
| 25 | Y02-5105 | Granules slurry (17) | (EXAMPLE #29) | PG-100 WHITE | |

Additional fire retardant systems were prepared for evaluation as follows:

SYSTEM DESCRIPTION: (System # 26 to 35 and #41, #42)

Step 1: Applied base coat on 1'×1', ⅝" thick plywood as following.

E-Tuff mixed membrane—4 part E-tuff and 1 part water by volume.

Add catalyst @30 ml per 5 gallon of E-Tuff.

Sand Slurry—1 part E-Tuff mixed membrane and 1 part 20 mesh washed, dried, rounded, 6.5+ Moh's minimum hardness sand by volume.

Granules/Powder Slurry—1 part E-Tuff mixed membrane and 1 part Example #1 granules/powder by volume.

Granules/Powder Slurry (L)—1 part E-Tuff mixed membrane and 1 part Example #1 (L) granules/powder by volume.

Granules Slurry (16)—1 part E-Tuff mixed membrane and 1 part Example #16 granules by volume.

Granules Slurry (17)—1 part E-Tuff mixed membrane and 1 part Example #17 granules by volume.

Applied base coat at a rate of 7.5 gallon/100 square feet. Wait for 30 minutes.

Step 2: Broadcast the aggregate to refusal. Wait for 24 hours.

Step 3: Applied Polyglaze 100 White with hardener at a rate of 1 gallon/100 sq.ft. and wait till it gets tack free.

Step 4: Then apply Polyglaze 100 White at a rate of 1 gallon/100 sq.ft.

NOTE:

L denotes light.

E-TUFF: COMMERCIALLY AVAILABLE PRODUCT FROM PSI, mixed E-Tuff comprises of E-Tuff and water in the ratio of 4:1 by volume and catalyst 30 ml/15 gal. of E-Tuff.

PG-100 WHITE: COMMERCIALLY AVAILABLE PRODUCT FROM POLYCOAT PRODUCTS.

B-TUFF 306: COMMERCIALLY AVAILABLE PRODUCT FROM PSI, mixed B-Tuff comprises of B-Tuff A-Side and B-Tuff B-side in the ratio of 4:1 by volume.

PRIMER 21: COMMERCIALLY AVAILABLE PRODUCT FROM POLYCOAT PRODUCTS, A-Side and B-Side in the ratio of 2:1 by volume ratio of 4:1 by volume.

TABLE IX

| | Step #1 7.5 gal/100 sq.ft. | Step #2 granules (Average 22 lbs./100 sq.ft.) | Step #3 1 gal/100 sq.ft. (with hardener) | Step #4 1 gal/100 sq.ft. |
|---|---|---|---|---|
| 26 Y02-3529 | Sand slurry | (EXAMPLE #13) | PG-100 WHITE | |
| 27 Y02-3530 | Sand slurry | (EXAMPLE #13 L) | PG-100 WHITE | |
| 28 Y02-3531 | Powder slurry | (EXAMPLE #13) | PG-100 WHITE | |
| 29 Y02-3532 | Powder slurry | (EXAMPLE #13 L) | PG-100 WHITE | |
| 30 Y02-3533 | Granules slurry | (EXAMPLE #13) | PG-100 WHITE | |
| 31 Y02-3534 | Granules slurry | (EXAMPLE #13 L) | PG-100 WHITE | |
| 32 Y02-3535 | Powder slurry (L) | (EXAMPLE #13) | PG-100 WHITE | |
| 33 Y02-3536 | Powder slurry (L) | (EXAMPLE #13 L) | PG-100 WHITE | |
| 34 Y02-3537 | Granules slurry (L) | (EXAMPLE #13) | PG-100 WHITE | |
| 35 Y02-3538 | Granules slurry (L) | (EXAMPLE #13 L) | PG-100 WHITE | |
| 41 Y02-5101 | Granules slurry (16) | (EXAMPLE #28) | PG-100 WHITE | |
| 42 Y02-5104 | Granules slurry (17) | (EXAMPLE #29) | PG-100 WHITE | |

Additional fire retardant systems were prepared for evaluation as follows:

SYSTEM DESCRIPTION: (System #36)

Step 1: Stapled metal lath to the 1'×1', ⅝" thick plywood.

Mixed Polyprime 21: Mix 2 part of Polyprime 21 side A and 1 part Polyprime side B by volume.

Granules/Powder Slurry: Mix 1 part of mixed Polyprime 21 and 1 part of Example #1 L powder.

Applied base coat at a rate of 7.5 gallon/100 square feet. Wait for 2 hours.

Step #2 Broadcast aggregate to refusal. Wait for 24 hours.

Step #3 Applied Mixed Polyprime 21 at a rate of 1 gallons per 100 square feet.

Step #4 Applied Mixed Polyprime 21 at a rate of 1 gallons per 100 square feet.

SYSTEM DESCRIPTION: (System #37)

Same as System #36 except without lath attached to the substrate.

SYSTEM DESCRIPTION: (System #38)

Same as System #37 except use granules instead of powder.

SYSTEM DESCRIPTION: (System #39 to #40)

Step 1: Applied base coat on 1'×1', ⅝" thick plywood as following.
B-Tuff 306 mixed membrane —4 part B-tuff 306 side A and 1 part B-Tuff 306 side B by volume.
Granules/Powder Slurry (L)—1 part B-Tuff 306 mixed membrane and 1 part Example #1 (L) granules/powder by volume.

Applied base coat at a rate of 7.5 gallon/100 square feet. Wait for 2 hours.

Step 2: Broadcast the fire retardant granules to refusal. Wait for 24 hours.

Step 3: Applied Polyglaze 100 White with hardener at a rate of 1 gallon/100 sq.ft. and wait till it gets tack free.

Step 4: Then apply Polyglaze 100 White at a rate of 1 gallon/100 sq.ft.

The systems so prepared are described in Table X:

TABLE X

| System# | Reference book# (without lath) | BASECOAT Step #1 7.5 gal/100 sq.ft. | AGGREGATE Step #2 granules (Average 22 lbs./100 sq.ft.) | 1st TOPCOAT Step #3 1 gal/100 sq.ft. | 2nd TOPCOAT Step #4 1 gal/100 sq.ft. |
|---|---|---|---|---|---|
| 36 | Y02-3539 | (Mixed Primer21 + EXAMPLE #1 L powder) slurry 1:2 by Volume for Vertical application | (EXAMPLE #1) | PRIMER 21 | |
| 37 | Y02-3540 | (Mixed Primer21 + EXAMPLE #1 L powder) slurry 1:2 by Volume for Vertical application | (EXAMPLE #1) | PRIMER 21 | |
| 38 | Y02-3541 | (Mixed Primer21 + EXAMPLE #1 L Granules) slurry 1:2 by Volume for Vertical application | (EXAMPLE #1) | PRIMER 21 | |
| 39 | Y02-3542 | (Mixed B-Tuff 306 + EXAMPLE #1 L powder) slurry | (EXAMPLE #1) | PG-100 WHITE | |
| 40 | Y02-3543 | (Mixed B-Tuff 306 + EXAMPLE #1 L Granules) slurry | (EXAMPLE #1) | PG-100 WHITE | |

The systems were fine tested in the manner described above. Results of this fine testing are reported in Table XI:

TABLE XI

| System# | Reference book # | TIME (min.) | TEMP. top surface (degree F.) | TEMP. at back with thermocouple (degree F.) | OBSERVATION |
|---|---|---|---|---|---|
| 1 | Y02-3501 | 0 | 100 | 95 | Fire testing stopped because fire reached to the wood and the charred structure started flowing down due to weight, charred structure turns whitish after 1 min. 30 sec., white smoke, fire does not self extinguish. |
| | | 1 | 958 | 105 | |
| | | 2 | 1060 | 127 | |
| | | 3 min. 17 sec. | 1100 | 145 | |
| 2 | Y02-3503 | 0 | 98 | 90 | Granules diffuses and charred up, black smoke, fumes started coming from the back after 2 minutes, wood burned significantly, fire does not self extinguish. |
| | | 1 | 1056 | 127 | |
| | | 2 | 1105 | 156 | |
| | | 3 | 1254 | 175 | |
| | | 4 | 1038 | 200 | |
| 3 | Y02-3505 | 0 | 99 | 92 | Granules diffuses and charred up, less smoke, fumes started coming from the back after 1 min. 30 sec., wood burned significantly, fire does not self extinguish. |
| | | 1 | 1256 | 119 | |
| | | 2 | 1117 | 189 | |
| | | 3 | 1358 | 214 | |
| | | 1 | 1116 | 132 | |
| | | 2 min. 45 sec. | 1143 | 200 | |
| 4 | Y02-3507 | 0 | 100 | 95 | Granules diffuses but very little charred structure rises up, too much damage to the wood, fire does not self extinguish. |
| | | 1 | 1116 | 132 | |
| | | 2 | 1259 | 168 | |
| | | 2 min. 45 sec | 1143 | 200 | |
| 5 | Y02-3509 | 0 | 100 | 94 | Granules charred up, less smoke, fumes started coming from the back after 2 minutes, too much damage to the wood, fire does not self extinguish. |
| | | 1 | 1023 | 122 | |
| | | 2 | 1151 | 178 | |
| | | 2 min. 35 sec | 1265 | 204 | |
| 6 | Y02-3511 | 0 | 101 | 94 | Pungent odor, granules charred up, black and dense smoke, less flame spread and less damage to the wood, fire does not self extinguish. |
| | | 1 | 943 | 108 | |
| | | 2 | 1205 | 154 | |
| | | 3 | 1067 | 207 | |

TABLE XI-continued

| System# | Reference book # | TIME (min.) | TEMP. top surface (degree F.) | TEMP. at back with thermocouple (degree F.) | OBSERVATION |
|---|---|---|---|---|---|
| 7 | Y02-3513 | 0 | 98 | 93 | Pungent order, granules charred up, testing |
|   |   | 1 | 1000 | 115 | stopped because of black and dense smoke, fire |
|   |   | 1 min. 30 sec | 1040 | 137 | does not self extinguish. |
| 8 | Y02-3515 | 0 | 101 | 96 | Granules diffuses and charred up, white and very |
|   |   | 1 | 1020 | 116 | little smoke, less flame spread and very less damage to the wood, fire self extinguishes and |
|   |   | 2 | 1294 | 199 | charred structure do not opens up as were in the |
|   |   | 3 | 988 | 214 | earlier cases. Same sample was burned t |
|   |   | 4 | 1156 | 219 | different spot for 10 minutes and there wasn't |
|   |   | 5 | 1457 | 244 | any significant damage to the wood. |
| 9 | Y02-3516 | 0 | 100 | 96 | Granules diffuses and charred up, white and little |
|   |   | 1 | 111 | 115 | smoke, flame spreads and very less damage to |
|   |   | 2 | 1357 | 146 | the wood, fire does not self extinguish. |
|   |   | 3 | 1081 | 186 |   |
|   |   | 3 min. 40 secs | 996 | 213 |   |
| 10 | Y02-3517 | 0 | 101 | 97 | Granules diffuses within 40 seconds and charred |
|   |   | 1 | 864 | 116 | up, white and very little smoke, less flame spread |
|   |   | 2 | 1169 | 145 | and very less damage to the wood, fire self |
|   |   | 3 | 1236 | 183 | extinguishes and charred structure do not opens |
|   |   | 4 | 1341 | 205 | up as were in the earlier cases. |
|   |   | 5 | 1088 | 212 |   |
| 11 | Y02-3518 | 0 | 102 | 99 | Fire testing stopped because flame spreads and |
|   |   | 1 | 1237 | 138 | base coat from the top starts melting, granules |
|   |   | 2 | 1150 | 179 | diffuses and forms charred structure, fire does |
|   |   | 3 | 1307 | 197 | not self extinguish and wood damaged. |
|   |   | 3 min. 12 sec | 1001 | 200 |   |
| 12 | Y02-5103 | 0 |   |   |   |
|   |   | 1 |   |   |   |
|   |   | 2 |   |   |   |
|   |   | 3 |   |   |   |
| 13 | Y02-5106 | 0 |   |   |   |
|   |   | 1 |   |   |   |
|   |   | 2 |   |   |   |
|   |   | 3 |   |   |   |
| 14 | Y02-3519 | 0 | 103 | 98 | White and less dense smoke, granules diffuses |
|   |   | 1 | 1100 | 104 | and charrs up but sand heats up, comes out from |
|   |   | 2 | 1049 | 135 | the basecoat slurry and damages the wood, fire |
|   |   | 3 | 1100 | 149 | does not self extinguish. |
|   |   | 4 | 1227 | 183 |   |
|   |   | 5 | 1252 | 210 |   |
|   |   | 6 | 1356 | 218 |   |
|   |   | 7 | 1141 | 229 |   |
|   |   | 8 | 1289 | 241 |   |
|   |   | 9 | 1321 | 252 |   |
|   |   | 10 | 1118 | 263 |   |
| 15 | Y02-3520 | 0 | 103 | 99 | White & less dense smoke, granules diffuse and |
|   |   | 1 | 1080 | 102 | charrs up but sand heats up, comes out from the |
|   |   | 2 | 1150 | 126 | basecoat slurry and damages the wood, fire does not |
|   |   | 3 | 1254 | 143 | self extinguish. |
|   |   | 4 | 1133 | 160 |   |
|   |   | 5 | 1284 | 180 |   |
|   |   | 6 | 1066 | 208 |   |
|   |   | 7 | 1271 | 216 |   |
|   |   | 8 | 1019 | 227 |   |
|   |   | 9 | 1173 | 239 |   |
|   |   | 10 | 1207 | 249 |   |
| 16 | Y02-3521 | 0 | 102 | 99 | White & less smoke, granules diffuse and charrs up, |
|   |   | 1 | 1123 | 104 | no damage to the wood, fire self extinguishes. |
|   |   | 2 | 1321 | 111 |   |
|   |   | 3 | 1241 | 112 |   |
|   |   | 4 | 1026 | 114 |   |
|   |   | 5 | 1156 | 116 |   |
|   |   | 6 | 1107 | 119 |   |
|   |   | 7 | 1066 | 122 |   |
|   |   | 8 | 1120 | 125 |   |
|   |   | 9 | 1277 | 128 |   |
|   |   | 10 | 1151 | 131 |   |
| 17 | Y02-3522 | 0 | 102 | 95 | White & less smoke, granules diffuse and charrs |
|   |   | 1 | 1123 | 96 | up, after 3 minutes sample was turned to vertical |
|   |   | 2 | 1321 | 97 | position and again fire was started, stopped after 7 |
|   |   | 3 | 1241 | 98 | minutes, no damage to the wood, fire self |
|   |   | 4 | 1026 | 114 | extinguishes. |
|   |   | 5 | 1156 | 119 |   |

TABLE XI-continued

| System# | Reference book # | TIME (min.) | TEMP. top surface (degree F.) | TEMP. at back with thermocouple (degree F.) | OBSERVATION |
|---|---|---|---|---|---|
|  |  | 6 | 1107 | 124 |  |
|  |  | 7 | 1066 | 130 |  |
| 18 | Y02-3523 | 0 | 99 | 97 | White & less smoke, granules diffuse and charrs up, no damage to the wood, fire self extinguishes. |
|  |  | 1 | 1148 | 98 |  |
|  |  | 2 | 1021 | 99 |  |
|  |  | 3 | 1278 | 100 |  |
|  |  | 4 | 1145 | 106 |  |
|  |  | 5 | 1084 | 113 |  |
|  |  | 6 | 1166 | 117 |  |
|  |  | 7 | 1029 | 121 |  |
|  |  | 8 | 1141 | 123 |  |
|  |  | 9 | 1263 | 129 |  |
|  |  | 10 | 1301 | 133 |  |
| 19 | Y02-3524 | 0 | 101 | 99 | White & less smoke, granules diffuse and charrs up, no damage to the wood, fire self extinguishes. |
|  |  | 1 | 1131 | 100 |  |
|  |  | 2 | 1284 | 102 |  |
|  |  | 3 | 1177 | 107 |  |
|  |  | 4 | 1069 | 113 |  |
|  |  | 5 | 1158 | 119 |  |
|  |  | 6 | 1094 | 125 |  |
|  |  | 7 | 1105 | 132 |  |
|  |  | 8 | 1160 | 138 |  |
|  |  | 9 | 1287 | 145 |  |
|  |  | 10 | 1119 | 154 |  |
| 20 | Y02-3525 | 0 | 98 | 95 | White & less smoke, granules diffuse and charrs up, fire was stopped after 3 minutes and then again started, no damage to the wood, fire self extinguishes. |
|  |  | 1 | 1123 | 96 |  |
|  |  | 2 | 1321 | 97 |  |
|  |  | 3 | 1241 | 100 |  |
|  |  | 4 | 1026 | 106 |  |
|  |  | 5 | 1156 | 113 |  |
| 21 | Y02-3526 | 0 | 99 | 96 | White, less smoke, granules diffuse and charrs up, no damage to the wood, fire does not self extinguish. |
|  |  | 1 | 1162 | 97 |  |
|  |  | 2 | 1354 | 99 |  |
|  |  | 3 | 1236 | 106 |  |
|  |  | 4 | 1085 | 112 |  |
|  |  | 5 | 1156 | 119 |  |
|  |  | 6 | 1170 | 127 |  |
|  |  | 7 | 1012 | 134 |  |
|  |  | 8 | 1190 | 140 |  |
|  |  | 9 | 1252 | 146 |  |
|  |  | 10 | 1115 | 152 |  |
| 22 | Y02-3527 | 0 | 100 | 99 | White, less smoke, granules diffuse and charrs up, no damage to the wood, fire does not self extinguish. |
|  |  | 1 | 1023 | 100 |  |
|  |  | 2 | 1159 | 102 |  |
|  |  | 3 | 1124 | 108/ |  |
|  |  | 4 | 1206 | 115 |  |
|  |  | 5 | 1171 | 121 |  |
|  |  | 6 | 1017 | 128 |  |
|  |  | 7 | 1123 | 135 |  |
|  |  | 8 | 1210 | 142 |  |
|  |  | 9 | 1251 | 148 |  |
|  |  | 10 | 1102 | 155 |  |
| 23 | Y02-3528 | 0 | 103 | 99 | White, less smoke, granules diffuse and charrs up, no damage to the wood, fire self extinguishes. |
|  |  | 1 | 1148 | 104 |  |
|  |  | 2 | 1352 | 104 |  |
|  |  | 3 | 1211 | 108 |  |
|  |  | 4 | 1037 | 114 |  |
|  |  | 5 | 1112 | 116 |  |
|  |  | 6 | 1109 | 119 |  |
|  |  | 7 | 1013 | 122 |  |
|  |  | 8 | 1172 | 125 |  |
|  |  | 9 | 1289 | 128 |  |
|  |  | 10 | 1161 | 131 |  |
| 24 | Y02-5102 | 0 | 102 | 98 | Predominantly white but slight black smoke also, granules diffuse and charrs up within 2-3 min., charred structure sags down after 5 min. but no damage to the wood, fire self extinguishes but takes around 45-50 seconds to do so. |
|  |  | 1 | 1464 | 105 |  |
|  |  | 2 | 1578 | 109 |  |
|  |  | 3 | 1599 | 120 |  |
|  |  | 4 | 1606 | 128 |  |
|  |  | 5 | 1588 | 137 |  |
|  |  | 6 | 1844 | 147 |  |
|  |  | 7 | 1856 | 158 |  |
|  |  | 8 | 1857 | 177 |  |
|  |  | 9 | 1689 | 200 |  |
|  |  | 10 | 1903 | 212 |  |

TABLE XI-continued

| System# | Reference book # | TIME (min.) | TEMP. top surface (degree F.) | TEMP. at back with thermocouple (degree F.) | OBSERVATION |
|---|---|---|---|---|---|
| 25 | Y02-5105 | 0 | 102 | 97 | White and very less smoke, granules diffuse and charrs up within 2 min., and sags down because of weight, no damage to the wood, fire self extinguishes. |
| | | 1 | 1334 | 99 | |
| | | 2 | 1552 | 104 | |
| | | 3 | 1474 | 117 | |
| | | 4 | 1602 | 127 | |
| | | 5 | 1735 | 132 | |
| | | 6 | 1823 | 146 | |
| | | 7 | 1754 | 154 | |
| | | 8 | 1841 | 156 | |
| | | 9 | 1666 | 170 | |
| | | 10 | 1972 | 180 | |
| 26 | Y02-3529 | 0 | 103 | 100 | White & less dense smoke, granules diffuse and charrs up but sand heats up, comes out from the basecoat slurry and damages the wood, fire does not self extinguish. |
| | | 1 | 1055 | 114 | |
| | | 2 | 1231 | 127 | |
| | | 3 | 1174 | 154 | |
| | | 4 | 1062 | 177 | |
| | | 5 | 1155 | 195 | |
| | | 6 | 1162 | 201 | |
| | | 7 | 1091 | 205 | |
| | | 8 | 1137 | 208 | |
| | | 9 | 1255 | 213 | |
| | | 10 | 1183 | 221 | |
| 27 | Y02-3530 | 0 | 103 | 100 | White & less dense smoke, granules diffuse and charrs up but sand heats up, comes out from the basecoat slurry and damages the wood, fire does not self extinguish. |
| | | 1 | 1117 | 118 | |
| | | 2 | 1364 | 142 | |
| | | 3 | 1205 | 170 | |
| | | 4 | 1066 | 202 | |
| | | 5 | 1123 | 213 | |
| | | 6 | 1104 | 222 | |
| | | 7 | 1045 | 235 | |
| | | 8 | 1181 | 247 | |
| | | 9 | 1211 | 257 | |
| | | 10 | 1181 | 269 | |
| 28 | Y02-3531 | 0 | 101 | 100 | White & less smoke, granules diffuse and charrs up, no damage to the wood, fire does not self extinguish. |
| | | 1 | 1065 | 114 | |
| | | 2 | 1250 | 119 | |
| | | 3 | 1174 | 123 | |
| | | 4 | 1031 | 127 | |
| | | 5 | 1158 | 134 | |
| | | 6 | 1191 | 142 | |
| | | 7 | 1028 | 152 | |
| | | 8 | 1161 | 163 | |
| | | 9 | 1206 | 174 | |
| | | 10 | 1167 | 189 | |
| 29 | Y02-3532 | 0 | 100 | 99 | White & less smoke, granules diffuse and charrs up, no damage to the wood, fire does not self extinguish. |
| | | 1 | 1210 | 104 | |
| | | 2 | 1158 | 105 | |
| | | 3 | 1271 | 106 | |
| | | 4 | 1055 | 110 | |
| | | 5 | 1122 | 116 | |
| | | 6 | 1181 | 122 | |
| | | 7 | 1047 | 129 | |
| | | 8 | 1256 | 136 | |
| | | 9 | 1173 | 144 | |
| | | 10 | 1207 | 155 | |
| 30 | Y02-3533 | 0 | 101 | 99 | White & less smoke, granules diffuse and charrs up, no damage to the wood, fire does not self extinguish. |
| | | 1 | 1008 | 103 | |
| | | 2 | 1145 | 105 | |
| | | 3 | 1281 | 109 | |
| | | 4 | 1139 | 114 | |
| | | 5 | 1077 | 121 | |
| | | 6 | 1201 | 130 | |
| | | 7 | 1187 | 138 | |
| | | 8 | 1119 | 147 | |
| | | 9 | 1217 | 157 | |
| | | 10 | 1119 | 169 | |
| 31 | Y02-3534 | 0 | 100 | 99 | White & less smoke, granules diffuse and charrs up, no damage to the wood, fire does not self extinguish. |
| | | 1 | 1171 | 99 | |
| | | 2 | 1247 | 100 | |
| | | 3 | 1161 | 104 | |
| | | 4 | 1087 | 110 | |
| | | 5 | 1185 | 116 | |
| | | 6 | 1202 | 122 | |
| | | 7 | 1156 | 129 | |

TABLE XI-continued

| System# | Reference book # | TIME (min.) | TEMP. top surface (degree F.) | TEMP. at back with thermocouple (degree F.) | OBSERVATION |
|---|---|---|---|---|---|
| | | 8 | 1243 | 138 | |
| | | 9 | 1191 | 149 | |
| | | 10 | 1121 | 161 | |
| 32 | Y02-3535 | 0 | 101 | 99 | White & less smoke, granules diffuse and charrs up, no damage to the wood, fire self extinguishes, fire stopped after 3 minutes and again started till 5 minutes. |
| | | 1 | 1081 | 100 | |
| | | 2 | 1098 | 100 | |
| | | 3 | 1084 | 104 | |
| | | 4 | 1060 | 114 | |
| | | 5 | 1145 | 119 | |
| 33 | Y02-3536 | 0 | 99 | 98 | White & less smoke, granules diffuse and charrs up, no damage to the wood, fire does not self extinguish. |
| | | 1 | 1099 | 98 | |
| | | 2 | 1130 | 100 | |
| | | 3 | 1178 | 105 | |
| | | 4 | 1054 | 111 | |
| | | 5 | 1241 | 119 | |
| | | 6 | 1163 | 126 | |
| | | 7 | 1184 | 134 | |
| | | 8 | 1096 | 143 | |
| | | 9 | 1162 | 151 | |
| | | 10 | 1255 | 165 | |
| 34 | Y02-3537 | 0 | 100 | 96 | White & less smoke, granules diffuse and charrs up, no damage to the wood, fire does not self extinguish. |
| | | 1 | 1157 | 96 | |
| | | 2 | 1201 | 97 | |
| | | 3 | 1177 | 99 | |
| | | 4 | 1160 | 103 | |
| | | 5 | 1211 | 108 | |
| | | 6 | 1040 | 113 | |
| | | 7 | 1129 | 119 | |
| | | 8 | 1137 | 127 | |
| | | 9 | 1171 | 138 | |
| | | 10 | 1011 | 151 | |
| 35 | Y02-3538 | 0 | 100 | 96 | White & less smoke, granules diffuse and charrs up, no damage to the wood, fire does not self extinguish. |
| | | 1 | 1222 | 96 | |
| | | 2 | 1106 | 97 | |
| | | 3 | 1149 | 102 | |
| | | 4 | 1001 | 107 | |
| | | 5 | 1118 | 111 | |
| | | 6 | 1151 | 117 | |
| | | 7 | 1175 | 126 | |
| | | 8 | 1244 | 137 | |
| | | 9 | 1150 | 149 | |
| | | 10 | 1096 | 164 | |
| 36 | Y02-3539 | 0 | 103 | 99 | White, less smoke with amine like smell, granules diffuse and charrs up, no damage to the wood, fire does not self extinguish |
| | | 1 | 1123 | 104 | |
| | | 2 | 1321 | 111 | |
| | | 3 | 1241 | 112 | |
| | | 4 | 1026 | 114 | |
| | | 5 | 1156 | 116 | |
| | | 6 | 1107 | 119 | |
| | | 7 | 1066 | 122 | |
| | | 8 | 1120 | 125 | |
| | | 9 | 1277 | 128 | |
| | | 10 | 1151 | 131 | |
| 37 | Y02-3540 | 0 | 100 | 99 | Burned 3 minutes horizontally, then turned the sample vertical and continued the test. White, less smoke with amine like smell, granules diffuse and charrs up, no damage to the wood, fire does not self extinguish. |
| | | 3 | 1146 | 107 | |
| | | 5 | 1170 | 118 | |
| | | 9 | 1188 | 126 | |
| | | 10 | 1059 | 132 | |
| | | 11 | 1167 | 150 | |
| | | 12 | 1201 | 160 | |
| | | 13 | 1137 | 167 | |
| | | 14 | 1081 | 175 | |
| | | 16 | 1133 | 190 | |
| | | 17 min. 35 sec | 1275 | 200 | |
| 38 | Y02-3541 | 0 | 100 | 99 | White, less smoke with amine like smell, granules diffuse and charrs up, no damage to the wood, fire does not self extinguish. |
| | | 1 | 1176 | 112 | |
| | | 5 | 1151 | 119 | |
| | | 7 | 1097 | 123 | |
| | | 8 | 1149 | 128 | |
| | | 9 | 1257 | 133 | |
| | | 10 | 1168 | 139 | |
| | | 11 | 1183 | 144 | |
| | | 12 | 1120 | 150 | |
| | | 13 | 1277 | 158 | |

TABLE XI-continued

| System# | Reference book # | TIME (min.) | TEMP. top surface (degree F.) | TEMP. at back with thermocouple (degree F.) | OBSERVATION |
|---|---|---|---|---|---|
|  |  | 15 | 1151 | 179 |  |
|  |  | 16 | 1029 | 188 |  |
|  |  | 17 | 1227 | 200 |  |
| 39 | Y02-3542 | 0 | 99 | 95 | White but smoke more than the other systems, granules diffuse and charrs up, resin melts and started flowing down, no damage to the wood, fire self extinguishes. |
|  |  | 1 | 1115 | 95 |  |
|  |  | 2 | 1124 | 96 |  |
|  |  | 3 | 1251 | 97 |  |
|  |  | 4 | 1136 | 103 |  |
|  |  | 5 | 1048 | 108 |  |
|  |  | 6 | 1194 | 114 |  |
|  |  | 7 | 1231 | 119 |  |
|  |  | 8 | 1127 | 124 |  |
|  |  | 9 | 1142 | 127 |  |
|  |  | 10 | 1076 | 133 |  |
| 40 | Y02-3543 | 0 | 99 | 95 | White but smoke more than the other systems, granules diffuse and charrs up, resin melts and started flowing down, no damage to the wood, fire self extinguishes. |
|  |  | 1 | 1159 | 95 |  |
|  |  | 2 | 1210 | 97 |  |
|  |  | 3 | 1144 | 100 |  |
|  |  | 4 | 1106 | 104 |  |
|  |  | 5 | 1235 | 110 |  |
|  |  | 6 | 1004 | 116 |  |
|  |  | 7 | 1192 | 123 |  |
|  |  | 8 | 1173 | 130 |  |
|  |  | 9 | 1117 | 136 |  |
|  |  | 10 | 1049 | 143 |  |

All patents, patent documents, and publications cited herein are incorporated by reference as if individually incorporated. Unless otherwise indicated, all parts and percentages are by weight and all molecular weights are weight average molecular weights. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. A method of forming a fire retardant coating by using a system having a first component and second component, which components are mixed at a site of application to a substrate, the method comprising the steps of:
   a) providing a first component that is a coatable polymeric coating composition;
   b) providing a second component comprising granules, wherein the granules comprise a polymeric matrix comprising a plurality of regions of fire retardant material ingredient incorporated therein, the first component and the second component provided as separate compositions as delivered to the site of application;
   c) applying the first component and the second component onto the substrate so that the granules are adhered to the substrate by the polymeric coating composition; and
   d) allowing the polymeric coating composition to cure to form a fire retardant coating.

2. The method of claim 1, wherein the applying step comprises simultaneous spraying of both the first and second components onto the substrate.

3. The method of claim 1, wherein the applying step comprises mixing of the first and second components together to form a mixture prior to application of the mixture to the substrate.

4. The method of claim 1, wherein the applying step comprises first applying the first component onto the substrate, followed by applying the second component onto the substrate that has been coated with the first component.

5. The method of claim 1, wherein the applying step comprises first applying the first component onto the substrate by rolling, squeegeeing or brushing, followed by applying the second component onto the substrate that has been coated with the first component by broadcasting.

6. The method of claim 1, wherein the polymer matrix of the granules is formed from a polymer selected from the group consisting of thermoplastic polyolefin, ethylene polypropylene rubber, ethylene propylene diene monomer polymers, epoxy, polyurethane, polyurea, polyester, silicone rubber, and copolymers and blends thereof.

7. The method of claim 1, wherein the polymer matrix of the granules is a rubbery material having a Shore A hardness of from about 25 to about 95.

8. The method of claim 1, wherein the granules comprise from about 45% to about 75% fire retardant ingredient by weight of the total weight of the granules.

9. The method of claim 1, wherein the average granule size is from about 90 mesh to about 0.25 inch in the longest dimension.

10. The method of claim 1, wherein the average granule size is from about 60 mesh to about 6 mesh.

11. The method of claim 1, wherein the average granule size is from about 60 mesh to about 12 mesh.

12. The method of claim 1, wherein the fire retardant ingredient comprises a polyphosphate.

13. The method of claim 12, wherein the polyphosphate comprises ammonium polyphosphate.

14. The method of claim 1, wherein the fire retardant ingredient is at least partially coated by a polymeric encapsulation coating.

15. The method of claim 1, wherein the coatable polymeric coating composition is a two part composition that comprises i. at least one ingredient having NCO functionality; and
ii. at least one ingredient having a functionality that is co-reactive with the NCO functionality when the second part and first part are mixed together so as to form a cured composition.

16. The method of claim 1, wherein the mixture of the first component and the second component has a pot life of less than 30 minutes.

17. The method of claim 1, further comprising the step of applying additional granules to the first and second components after application of the first and second components to the substrate but before cure, thereby bonding additional granules to the substrate as part of the fire-retardant coating.

18. The method of claim 1, wherein at least a portion of the granules are at least partially exposed, and are not fully entrained in the fire retardant coating.

19. The method of claim 1, wherein the second component consists only of granules in the dry form.

20. The method of claim 1, wherein the second component is a slurry of granules in a non-reactive carrier liquid.

* * * * *